US012417889B2

(12) United States Patent
Montgomery et al.

(10) Patent No.: US 12,417,889 B2
(45) Date of Patent: Sep. 16, 2025

(54) SWITCHES WITH INTEGRAL OVERCURRENT PROTECTION COMPONENTS

(71) Applicant: MP Hollywood, Lombard, IL (US)

(72) Inventors: Robert D. Montgomery, Lemont, IL (US); James C. Allison, Jackson, MI (US)

(73) Assignee: MP Hollywood, Lombard, IL (US)

( * ) Notice: Subject to any disclaimer, the term of this patent is extended or adjusted under 35 U.S.C. 154(b) by 0 days.

(21) Appl. No.: 18/528,159

(22) Filed: Dec. 4, 2023

(65) Prior Publication Data

US 2024/0258058 A1 Aug. 1, 2024

Related U.S. Application Data

(62) Division of application No. 16/942,275, filed on Jul. 29, 2020, now Pat. No. 11,837,426.

(60) Provisional application No. 62/880,517, filed on Jul. 30, 2019.

(51) Int. Cl.

*H01H 71/16* (2006.01)
*H01H 19/04* (2006.01)
*H01H 19/14* (2006.01)
*H01H 71/08* (2006.01)
*H01H 77/04* (2006.01)

(52) U.S. Cl.

CPC ............ *H01H 71/16* (2013.01); *H01H 19/04* (2013.01); *H01H 19/14* (2013.01); *H01H 71/08* (2013.01); *H01H 77/04* (2013.01)

(58) Field of Classification Search

CPC ........ H01H 71/16; H01H 19/04; H01H 19/14; H01H 71/08; H01H 77/04
USPC .......................................................... 337/13
See application file for complete search history.

(56) References Cited

U.S. PATENT DOCUMENTS 2,182,315 A * 12/1939 Hart ................... H01H 35/2607 337/13
2,434,984 A * 1/1948 Bolesky ................. H01H 77/04 337/368
2,696,538 A * 12/1954 O'Neill .................. H01H 77/04 337/91
2,810,041 A * 10/1957 Wills ..................... H01H 77/04 337/91
2,825,960 A * 3/1958 Protz ........................ H01H 5/18 200/275
2,839,638 A * 6/1958 Epstein .................. H01H 73/30 200/406
2,901,574 A * 8/1959 Raab ...................... H01H 19/02 337/41
3,832,667 A * 8/1974 Blanton ................. H01H 37/26 337/72

(Continued)

*Primary Examiner* — Anatoly Vortman
(74) *Attorney, Agent, or Firm* — Knobbe, Martens, Olson & Bear, LLP

(57) ABSTRACT

Switches with integrated overcurrent protection elements are described. The overcurrent protection elements can include a bimetallic structure which is configured to move between a first shape and a second shape in response to heating. The overcurrent protection element can be rotationally coupled to a rotary knob in some embodiments. In other embodiments, the overcurrent protection element can be fixed, and the rotary knob can be connected to one or more rotatable conductive structures within the rotary switch.

20 Claims, 27 Drawing Sheets

(56) References Cited

U.S. PATENT DOCUMENTS

| | | | | | |
|---|---|---|---|---|---|
| 3,852,697 | A * | 12/1974 | Snider | H01H 37/54 | 337/353 |
| 4,891,476 | A * | 1/1990 | Nation | H01H 13/585 | 200/11 R |
| 4,973,933 | A * | 11/1990 | Kadlubowski | H01H 89/04 | 219/486 |
| 5,436,413 | A * | 7/1995 | Katakami | H01H 19/02 | 200/11 DA |
| 5,821,801 | A * | 10/1998 | Kolb | H01H 37/52 | 337/380 |
| 6,538,549 | B1 * | 3/2003 | Renne | H01H 73/28 | 337/55 |
| 6,744,345 | B2 * | 6/2004 | Korczynski | H01H 81/02 | 337/72 |
| 7,952,461 | B2 * | 5/2011 | Brusky | H01H 37/58 | 361/93.8 |
| 9,911,567 | B2 * | 3/2018 | Schwartz | H01H 71/16 | |
| 10,475,603 | B2 * | 11/2019 | Wilkins | H01H 11/00 | |
| 2003/0047432 | A1 * | 3/2003 | Danek | H01H 19/563 | 200/11 R |
| 2016/0358738 | A1 * | 12/2016 | Schwartz | H01H 19/14 | |
| 2023/0118335 | A1 * | 4/2023 | Ha | H01H 71/16 | 337/36 |

* cited by examiner

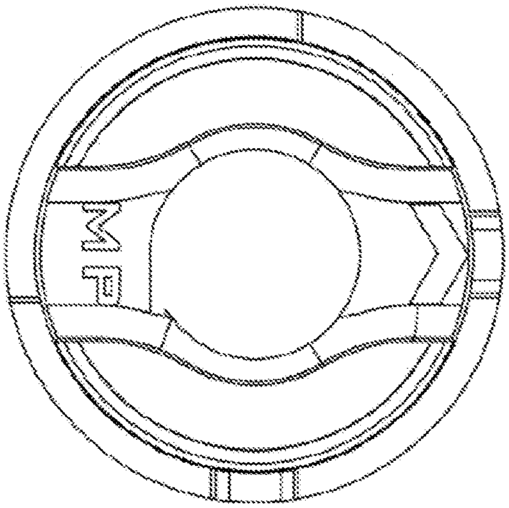
Figure 7
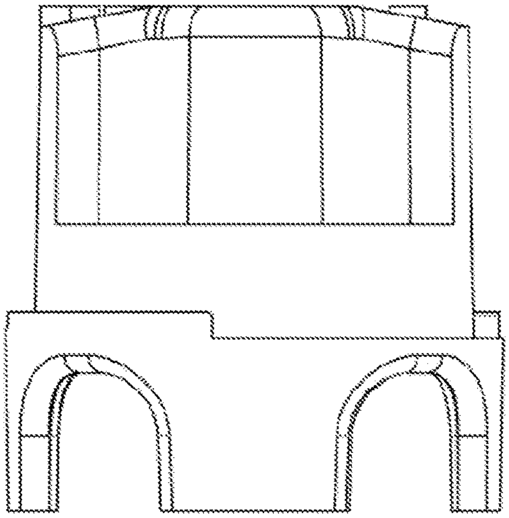
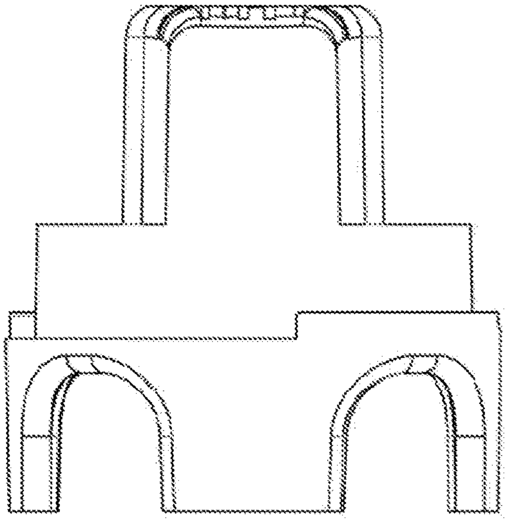
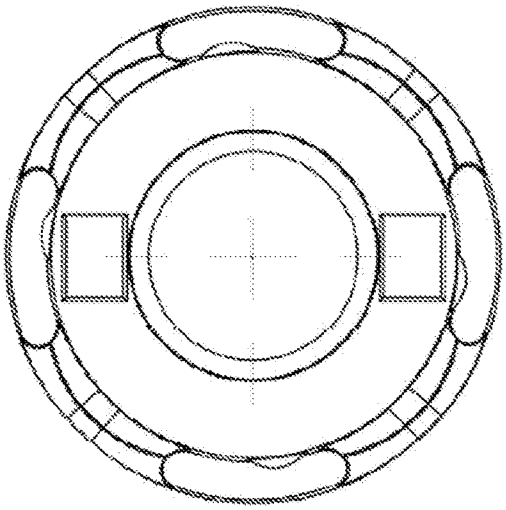

201

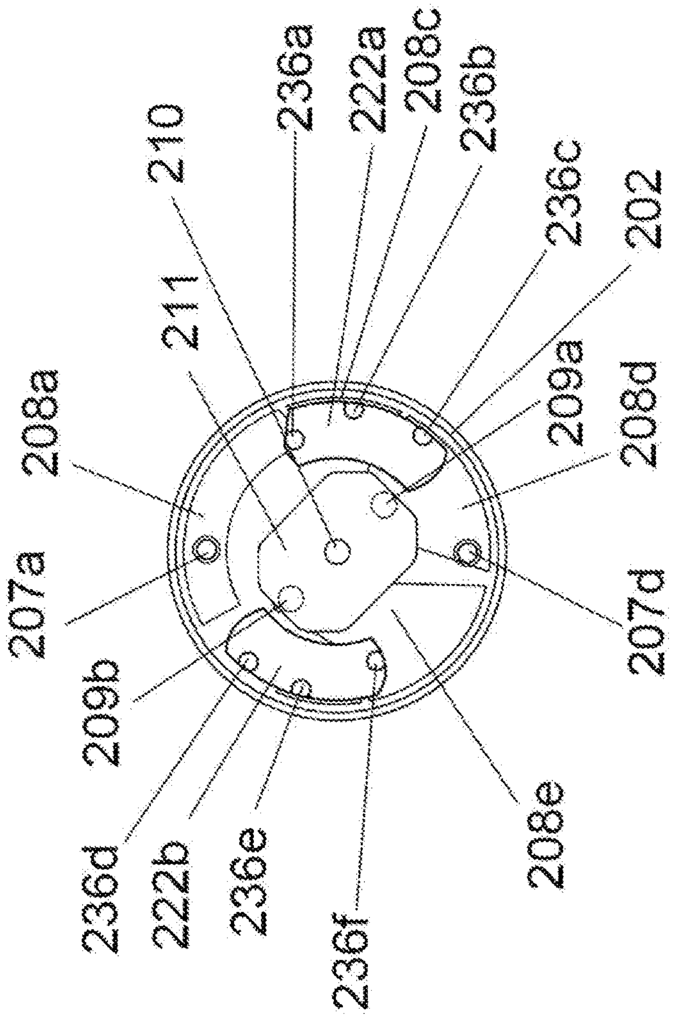
Figure 14b
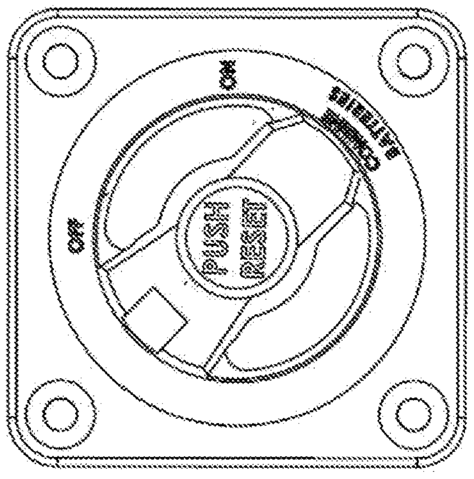
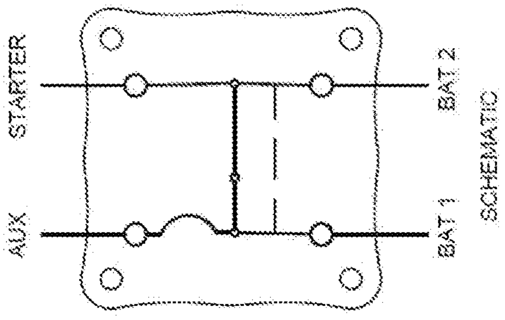

SWITCHES WITH INTEGRAL OVERCURRENT PROTECTION COMPONENTS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application is a divisional of U.S. patent application Ser. No. 16/942,275, filed Jul. 29, 2020, which claims the benefit of U.S. Provisional Application No. 62/880,517, filed Jul. 30, 2019 and entitled SWITCHES WITH INTEGRAL OVERCURRENT PROTECTION COMPONENTS, the disclosure of which is hereby incorporated by reference in its entirety.

BACKGROUND

Technical Field

Embodiments of switches with integral overcurrent protection components are discussed.

Description of the Related Art

In many wiring arrangements, a separate circuit breaker or other overcurrent protection device is provided in series with a switch configured to control the flow of current to a device and through the separate overcurrent protection device.

SUMMARY

In a first broad aspect, a rotary switch including an integrated overcurrent protection device is provided, the switch including a housing a first terminal extending into the housing and electrically connected to a first terminal contact; a second terminal extending into the housing and electrically connected to a second; a knob rotatable with respect to the housing; and an overcurrent protection element located within the housing and rotationally coupled to the knob to rotate in response to rotation of the knob, the overcurrent protection element rotatable between a first angular orientation in which the overcurrent protection element is electrically connected to the first and second terminal contacts and a second angular orientation in which the overcurrent protection element is not electrically connected to at least one of the first and second terminal contacts.

The overcurrent protection device can include a bimetallic element configured to change shape in response to electrical current above a specified limit. The bimetallic element can be configured to change shape between a first position in which the bimetallic element is electrically connected to the first and second terminal contacts when the overcurrent protection element is in the first angular orientation, and a second position in which the bimetallic element is curved such that the bimetallic element is not electrically connected to at least one of the first and second terminal contacts when the overcurrent protection element is in the first angular orientation.

The overcurrent protection device can include a bimetallic element located within the housing, the bimetallic element configured to deform from a first position to a second position in response to an electrical current above a specified limit. The bimetallic element can be supported by and configured to rotate around a central post, where the bimetallic element can be configured to deform to a second position by radially outward sections of the bimetallic element flexing away from the first and second terminal contacts. The rotary switch can also include a reset mechanism configured to reset the bimetallic element from the second position to the first position. The reset mechanism can include a reset button concentric with the center post and a reset plate operably connected to the reset button, and depressing the reset button can force the reset plate against the bimetallic element to move the bimetallic element to the first position. The reset button can be concentric with the knob and extends through a through-hole in the knob.

In another broad aspect, a rotary switch including an integrated overcurrent protection device is provided, the switch including a housing; a first terminal extending into the housing and electrically connected to a first terminal contact; a second terminal extending into the housing and electrically connected to a second terminal contact; a knob rotatable with respect to the housing; an overcurrent protection element which includes a bimetallic element located within the housing, supported by and configured to rotate around a central post, and rotationally coupled to the knob to rotate in response to rotation of the knob, the bimetallic element rotatable between a first angular orientation in which the bimetallic element is electrically connected to the first and second terminal contacts and a second angular orientation in which the bimetallic element is not electrically connected to the first and second terminal contacts, the bimetallic element configured to change shape by curving in response to electrical current above a specified limit, between a first position in which the bimetallic element is electrically connected to the first and second terminal contacts when the bimetallic element is in the first angular orientation, and a second position in which the bimetallic element is curved such that the bimetallic element is not electrically connected to the first and second terminal contacts when the bimetallic element is in the first angular orientation; a reset mechanism configured to reset the bimetallic element from the second position to the first position, the reset mechanism including a reset button concentric with the center post and the knob and extending through a through-hole in the knob, and a reset plate operably connected to the reset button, wherein depressing the reset button forces the reset plate against the bimetallic element to move the bimetallic element to the first position; and a spring biasing the reset plate away from the bimetallic element.

The overcurrent protection device can include a fuse. The overcurrent protection device can include a cartridge fuse. The overcurrent protection device can include a fuse or cartridge fusc.

In another broad aspect, a rotary switch including an integrated overcurrent protection device is provided, the switch including a housing a first terminal; a second terminal; a knob rotatable with respect to the housing; a bimetallic element located within the housing, the bimetallic element configured to deform from a first position to a second position in response to an electrical current above a specified limit, the bimetallic element rotationally coupled to the knob to rotate in response to rotation of the knob, the bimetallic element rotatable between a first angular orientation and a second angular orientation, the bimetallic element forming part of an electrical connection between the first and second terminals when the bimetallic element is in the first position and at the first angular orientation, the bimetallic element not being electrically connected to at least one of the first and second terminals when the bimetallic element is at the second angular orientation; and a reset mechanism configured to move the bimetallic element from the second position into the first position.

The reset mechanism can include a reset button and a reset plate operably connected to the reset button. Depressing the reset button can force the reset plate against the bimetallic element to move the bimetallic element to the first position, and the bimetallic element can be generally planar in the first position. The reset button can be concentric with the knob and extends through a through-hole in the knob. The bimetallic element can be supported by and configured to rotate about a center post, and wherein the reset button is concentric with the center post. The reset mechanism can further include a spring biasing the reset plate away from the bimetallic element.

The first terminal can be electrically connected to a first stationary contact within the housing and the second terminal can be electrically connected to a second stationary contact within the housing, where the bimetallic element can include a first electrical contact and a second electrical contact When the bimetallic element is at the first angular orientation and in the first position, the first electrical contact can be aligned with and in contact with the first stationary contact and the second electrical contact can be aligned with and in contact with the second stationary contact.

In another broad aspect, a switch including an integrated overcurrent protection device is provided, the switch including a housing a first terminal extending into the housing and electrically connected to a first terminal contact; a second terminal extending into the housing and electrically connected to a second; a switch interface movable with respect to the housing; and an overcurrent protection element located within the housing and coupled to switch interface to move in response to movement of the switch interface, the overcurrent protection element movable between a first position in which the overcurrent protection element is electrically connected to the first and second terminal contacts and a second position in which the overcurrent protection element is not electrically connected to at least one of the first and second terminal contacts.

The overcurrent protection element can be configured to be linearly translated between the first position and the second position.

In another broad aspect, a rotary switch including an integrated overcurrent protection device is provided, the switch including a housing a first terminal extending into the housing and electrically connected to a first terminal contact; a second terminal extending into the housing and electrically connected to a second terminal contact; an overcurrent protection element located within the housing and configured to be placed in electrical communication with the first terminal contact at a first stationary contact location and in electrical communication with the second terminal contact at a second stationary contact location; a third terminal extending into the housing and electrically connected to a third terminal contact; a knob rotatable with respect to the housing; and an arcuate bus bar located within the housing and rotationally coupled to the knob to rotate in response to rotation of the knob, the arcuate bus bar movable between a first angular orientation in which the arcuate bus bar is electrically connected to the first terminal contact and the third terminal contact, and a second angular orientation in which the arcuate bus bar is not in electrical communication with either of the first terminal contact or the third terminal contact.

The arcuate bus bar can be located radially outward of the first and second stationary contact locations. The arcuate bus bar can be configured to rotate around a longitudinal axis concentric with the curve of the arcuate bus bar. The overcurrent protection element can be rotationally uncoupled from the knob or the arcuate bus bar. The arcuate bus bar can include at least a first longitudinally protruding section and a second longitudinally protruding section, the first and second longitudinally protruding sections located closer to the first, second, and third terminal contacts than a recessed portion of the arcuate bus bar extending between the first and second longitudinally protruding sections. When the arcuate bus bar is at the first angular orientation, the first longitudinally protruding section can be in contact with the first terminal contact and the second longitudinally protruding section can be in contact with the third terminal contact.

The arcuate bus bar can be supported by an insulating retaining ring. The retaining ring can be biased in the direction of the first, second, and third terminal contacts by at least one spring.

The overcurrent protection device can include a bimetallic element configured to change shape from a first shape to a second shape in response to electrical current above a specified limit. The rotary switch can additionally include a reset mechanism configured to change the bimetallic element back to the first shape, the reset mechanism including a reset plate operably connected to a reset button extending through a through-hole in the knob. The overcurrent protection device can include a fuse.

In another broad aspect, a rotary switch including an integrated overcurrent protection device is provided, the switch including a housing, a first terminal extending into the housing and electrically connected to a first terminal contact; a second terminal extending into the housing and electrically connected to a second terminal contact; an overcurrent protection element located within the housing and configured to be placed in electrical communication with the first terminal contact at a first stationary contact location and in electrical communication with the second terminal contact at a second stationary contact location; a third terminal extending into the housing and electrically connected to a third terminal contact; a fourth terminal extending into the housing and electrically connected to a fourth terminal contact; a knob rotatable with respect to the housing; and an arcuate bus bar located within the housing and rotationally coupled to the knob to rotate in response to rotation of the knob, the arcuate bus bar movable between a first angular orientation in which the arcuate bus bar is electrically connected to the first terminal contact and the third terminal contact, a second angular orientation in which the arcuate bus bar is electrically connected to the first terminal contact, the third terminal contact, and the fourth terminal contact, a third angular orientation in which the arcuate bus bar is electrical connected to the first terminal contact and the fourth terminal contact, a fourth angular orientation in which the arcuate bus bar is not in electrical communication with any of the first terminal contact, the third terminal contact, or the fourth terminal contact.

The arcuate bus bar can be located radially outward of the first and second stationary contact locations. The arcuate bus bar can be configured to rotate around a longitudinal axis concentric with the curve of the arcuate bus bar. The overcurrent protection element can be not rotationally coupled to the knob or the arcuate bus bar.

The arcuate bus bar can include at least a first longitudinally protruding section, a second longitudinally protruding section, and a third longitudinally protruding section, the first and second longitudinally protruding sections located closer to the first, second, and third terminal contacts than a first recessed portion of the arcuate bus bar extending between the first and second longitudinally protruding sections and a second recessed portion of the arcuate bus bar extending between the second and third longitudinally protruding sections. When the arcuate bus bar is at the first angular orientation, the first longitudinally protruding section can be in contact with the first terminal contact and the second longitudinally protruding section can be in contact with the third terminal contact. When the arcuate bus bar is at the second angular orientation, the first longitudinally protruding section can be in contact with the fourth terminal contact, the second longitudinally protruding section can be in contact with the first terminal contact, and the third longitudinally protruding section can be in contact with the third terminal contact. When the arcuate bus bar is at the third angular orientation, the second longitudinally protruding section can be in contact with the fourth terminal contact and the third longitudinally protruding section can be in contact with the first terminal contact.

The arcuate bus bar can be supported by an insulating retaining ring. The retaining ring can be biased in the direction of the first, second, third, and fourth terminal contacts by at least one spring. The overcurrent protection device can include a bimetallic element configured to change shape from a first shape to a second shape in response to electrical current above a specified limit. The rotary switch can additionally include a reset mechanism configured to change the bimetallic element back to the first shape, the reset mechanism including a reset plate operably connected to a reset button extending through a through-hole in the knob. The overcurrent protection device can include a fuse.

In another broad aspect, a rotary switch can include an integrated overcurrent protection device, the switch including a housing a first terminal extending into the housing and electrically connected to a first terminal contact; a second terminal extending into the housing and electrically connected to a second terminal contact; a third terminal extending into the housing and electrically connected to a third terminal contact; a fourth terminal extending into the housing and electrically connected to a fourth terminal contact; a first contact point within the housing; an overcurrent protection element located within the housing and configured to be placed in electrical communication with the third terminal contact at a third stationary contact location and in electrical communication with the first contact point at a first contact point location; a knob rotatable with respect to the housing; and a first arcuate bus bar located within the housing and rotationally coupled to the knob to rotate in response to rotation of the knob, the arcuate bus bar movable between a first angular orientation in which the arcuate bus bar is electrically connected to the first terminal contact and the second terminal contact, a second angular orientation in which the arcuate bus bar is electrically connected to the first terminal contact, the second terminal contact, and the third terminal contact, a third angular orientation in which the arcuate bus bar only in electrical communication with the first terminal contact, and is not in electrical communication with any of the second terminal contact, the third terminal contact, the fourth terminal contact, or the first contact point, a second arcuate bus bar located within the housing and rotationally coupled to the knob to rotate in response to rotation of the knob, the arcuate bus bar movable between a first angular orientation in which the arcuate bus bar is electrically connected to the fourth terminal contact and the first contact point, a second angular orientation in which the arcuate bus bar is electrically connected to the fourth terminal contact and the first contact point, a third angular orientation in which the arcuate bus bar is only in connection with the third terminal contact, and not in electrical communication with any of the first terminal contact, the second terminal contact, the fourth terminal contact, or the first contact point.

The arcuate bus bars can be configured to rotate around a longitudinal axis concentric with the curve of the arcuate bus bars. The overcurrent protection element can be not rotationally coupled to the knob or the arcuate bus bars.

The arcuate bus bars can each include at least a first longitudinally protruding section, a second longitudinally protruding section, and a third longitudinally protruding section, the first, second and third longitudinally protruding sections located closer to the first, second, third, and fourth terminal contacts and the first contact point than a first recessed portion of the arcuate bus bars extending between the first and second longitudinally protruding sections and a second recessed portion of the arcuate bus bar extending between the second and third longitudinally protruding sections.

When the first arcuate bus bar is at the first angular orientation, the first and second longitudinally protruding section can be in contact with the first terminal contact, and the third longitudinally protruding section can be in contact with the second terminal contact. When the first arcuate bus bar is at the second angular orientation, the first longitudinally protruding section can be in contact with the first terminal contact, the second longitudinally protruding section can be in contact with the second terminal contact, and the third longitudinally protruding section can be in contact with the third terminal contact. When the first arcuate bus bar is at the third angular orientation, the first and second longitudinally protruding sections can be not in contact with any of the first, second, third, or fourth terminal contacts, or the first contact point, and the third longitudinally protruding section can be in contact with the first terminal contact.

When the second arcuate bus bar is at the first angular orientation, the first longitudinally protruding section can be in contact with the fourth terminal contact, and the second and third longitudinally protruding sections can be in contact with the first contact point. When the second arcuate bus bar is at the second angular orientation, the first longitudinally protruding section can be not in contact with any of the first, second, third, or fourth terminal contacts, or the first contact point, the second longitudinally protruding section can be in contact with the fourth terminal contact, and the third longitudinally protruding section can be in contact with the first contact point. When the second arcuate bus bar is at the third angular orientation, the first, second, and third longitudinally protruding sections can be in contact with the third terminal contact.

The arcuate bus bar can be supported by an insulating retaining ring. The retaining ring can be biased in the direction of the first, second, third, and fourth terminal contacts and the first contact point by at least one spring. The first and second bus bars can be biased in the direction of the first, second, third and fourth terminal contacts and the first contact point by at least one spring.

The overcurrent protection device can include a bimetallic element configured to change shape from a first shape to a second shape in response to electrical current above a specified limit. The rotary switch can additionally include a reset mechanism configured to change the bimetallic element back to the first shape, the reset mechanism including a reset plate operably connected to a reset button extending through a through-hole in the knob. The overcurrent protection device can include a fuse.

In another broad aspect, a rotary switch including an integrated overcurrent protection device is provided, the switch including a housing; a first terminal extending into the housing and electrically connected to a first terminal contact; a second terminal extending into the housing and electrically connected to a second terminal contact; an overcurrent protection element located within the housing; a knob rotatable with respect to the housing; and a rotatable conductive element located within the housing and rotationally coupled to the knob to rotate in response to rotation of the knob, the conductive element rotatable between a first angular orientation in which the conductive element is electrically connected to the first and second terminal contacts and a second angular orientation in which the conductive element is not electrically connected to at least one of the first and second terminal contacts.

The conductive element can include the overcurrent protection element, and the overcurrent protection element can include a bimetallic element configured to change shape in response to electrical current above a specified limit. The bimetallic element can be configured to change shape between a first position in which the bimetallic element is electrically connected to the first and second terminal contacts when the overcurrent protection element is in the first angular orientation, and a second position in which the bimetallic element is curved such that the bimetallic element is not electrically connected to at least one of the first and second terminal contacts when the overcurrent protection element is in the first angular orientation.

The rotary switch can additionally include a third terminal extending into the housing and electrically connected to a third terminal contact. The overcurrent protection element can be configured to be placed in electrical communication with the first terminal contact at a first stationary contact location and in electrical communication with the third terminal contact at a second stationary contact location, wherein the rotatable conductive element can include an arcuate bus bar, wherein the arcuate bus bar can be movable in response to rotation of the knob between a first angular orientation in which the arcuate bus bar is electrically connected to the first terminal contact and the second terminal contact and a second orientation in which the arcuate bus bar is not in electrical communication with either or both of the first terminal contact or the second terminal contact. The arcuate bus bar can include at least a first longitudinally protruding section and a second longitudinally protruding section, the first and second longitudinally protruding sections located closer to the first, second, and third terminal contacts than a recessed portion of the arcuate bus bar extending between the first and second longitudinally protruding sections, and, when the arcuate bus bar is at the first angular orientation, the first longitudinally protruding section is in contact with the first terminal contact and the second longitudinally protruding section is in contact with the second terminal contact.

The rotary switch can further include a fourth terminal extending into the housing and electrically connected to a fourth terminal contact.

The overcurrent protection element can be configured to be placed in electrical communication with the first terminal contact at a first stationary contact location and in electrical communication with the third terminal contact at a second stationary contact location, wherein the rotatable conductive element can include an arcuate bus bar. The arcuate bus bar can be movable between a first angular orientation in which the arcuate bus bar is electrically connected to the first terminal contact and the second terminal contact, a second angular orientation in which the arcuate bus bar is not in electrical communication with any of the first terminal contact, the second terminal contact, or the fourth terminal contact; a third angular orientation in which the arcuate bus bar is electrically connected to the first terminal contact, the second terminal contact, and the fourth terminal contact; and a fourth angular orientation in which the arcuate bus bar is electrically connected to the first terminal contact and the fourth terminal contact.

The overcurrent protection element can be configured to be placed in electrical communication with the first contact point at a first stationary contact location and in electrical communication with the second terminal contact at a second stationary contact location, and the rotatable conductive element can include a first arcuate bus bar. The switch can further include a second arcuate bus bar rotationally coupled to the first arcuate bus bar to rotate along with the first arcuate bus bar in response to rotation of the knob. The first and second arcuate bus bars can be movable between a first angular orientation in which the first arcuate bus bar is electrically connected to the first terminal contact and the third terminal contact and the second arcuate bus bar is electrically connected to the fourth terminal contact and the first contact point, a second angular orientation in which the first arcuate bus bar is electrically connected to the first terminal contact, the second terminal contact, and the third terminal contact, and the second arcuate bus bar is electrically connected to the fourth terminal contact and the first contact point, and a third angular orientation in which the first arcuate bus bar is in electrical communication with the first terminal contact, and is not in electrical communication with any of the second terminal contact, the third terminal contact, the fourth terminal contact, or the first contact point, and in which the second arcuate bus bar is only in electrical communication with the second terminal contact, and is not in electrical communication with any of the first terminal contact, the third terminal contact, the fourth terminal contact, or the first contact point.

The rotary switch can further include an insulating retainer supporting the arcuate bus bar or the first and second arcuate bus bar, wherein the insulating retainer can include a retainer ring, and wherein the insulating retainer can be biased in the direction of the terminal contacts by at least one spring.

The overcurrent protection element can be not rotationally coupled to the knob. The overcurrent protection element can include a bimetallic element configured to change shape in response to electrical current above a specified limit. The bimetallic element can be configured to change shape between a first position in which the bimetallic element is electrically connected to the first and second stationary contact locations and a second position in which the bimetallic element is not electrically connected to at least one of the first and second stationary contact locations. The rotary switch can further include a reset mechanism configured to reset the bimetallic element from the second position to the first position, wherein the reset mechanism can include a reset button concentric with a center post and a reset plate operably connected to the reset button, and wherein depressing the reset button can force the reset plate against the bimetallic element to move the bimetallic element to the first position. The reset button can be concentric with the knob and extend through a through-hole in the knob. The reset button can be biased away from the bimetallic element by a spring.

BRIEF DESCRIPTION OF THE DRAWINGS

Embodiments of this disclosure will now be described, by way of non-limiting example, with reference to the accompanying drawings.

FIG. 7 shows multiple views of a switch cover which can be used with a rotary switch described herein.

FIG. 10*a* also shows the position of certain internal elements with the switch in the "1" position.

FIG. 10*b* also shows the position of certain internal elements with the switch in the "1+2" position.

FIG. 10*c* also shows the position of certain internal elements with the switch in the "2" position.

FIG. 10*d* also shows the position of certain internal elements with the switch in the "Off" position.

FIG. 14*a* also shows the position of certain internal elements with the switch in the "ON" position and an electrical schematic of the internal switch circuit in the "ON" position.

FIG. 14*b* is a top plan view of the rotatable multi-pole switch of FIG. 12*a*, with the switch in the "COMBINE" position. FIG. 14*b* also shows the position of certain internal elements with the switch in the "COMBINE" position and an electrical schematic of the internal switch circuit in the "COMBINE" position.

FIG. 14*c* also shows the position of certain internal elements with the switch in the "OFF" position and an electrical schematic of the internal switch circuit in the "OFF" position.

DETAILED DESCRIPTION

Figure 1A:
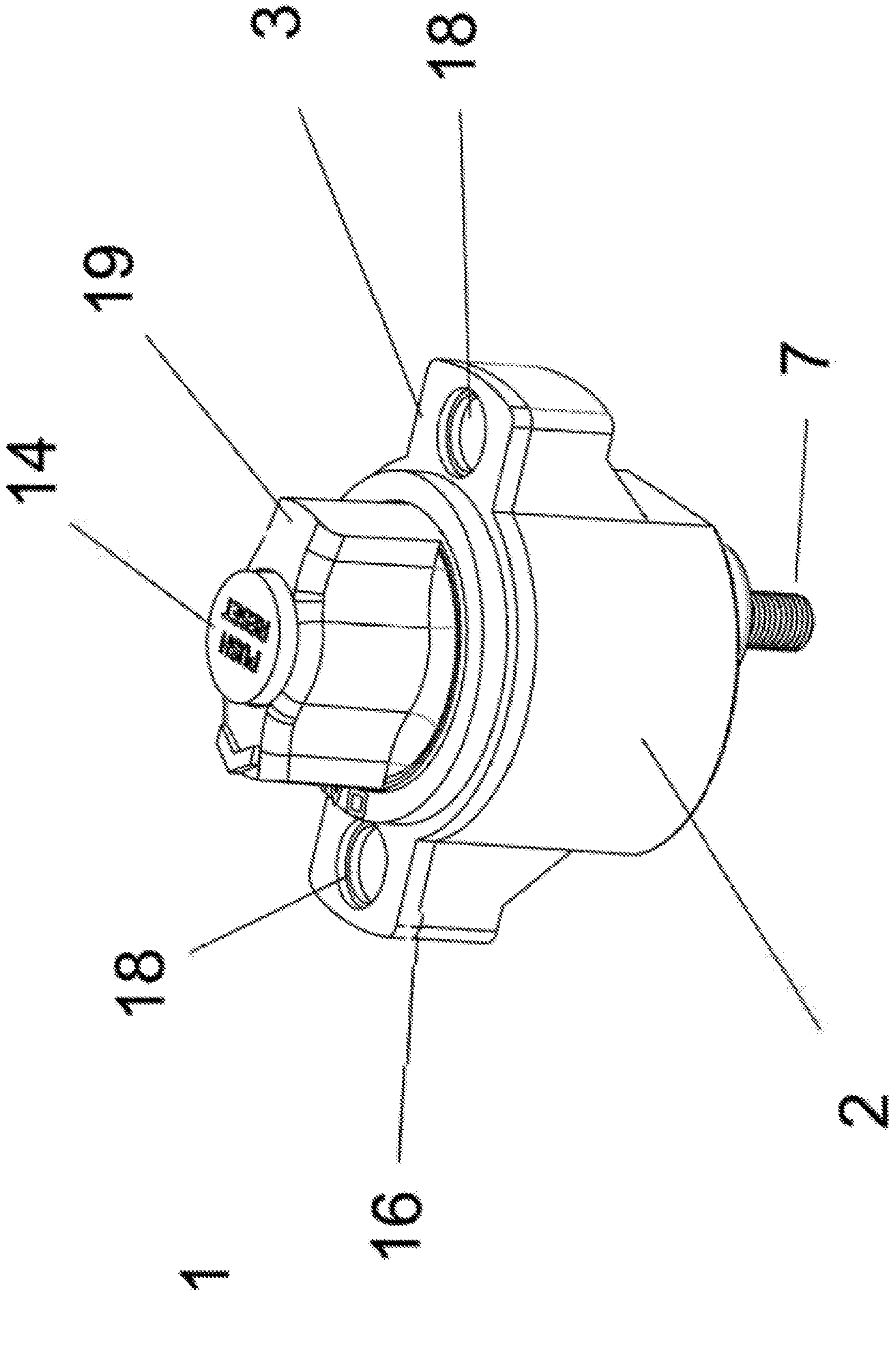
FIG. 1*a* is a perspective view of an embodiment of a rotary switch with an integrated overcurrent protection element, shown from above.

The following description of certain embodiments presents various descriptions of specific embodiments. However, the innovations described herein can be embodied in a multitude of different ways, for example, as defined and covered by the claims. In this description, reference is made to the drawings, where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

There exist a number of electrical circuit protection devices and a number of manual actuated switches or disconnects rated for low voltage, which may be defined as voltages under 600V. Many electrical circuits, such as circuits in marine applications, require on-off switching, disconnection from battery banks, and over-current protection. To obtain all these functions, a circuit typically requires at least two separate products: a switch/disconnect component, and a separate over-current protection device, such as a fuse or circuit breaker.

In many applications, a switch/disconnect with a manually operated rotational actuator is preferred for ease-of-use, to be able to connect one or more power sources, like battery banks, into the circuit, or to disconnect the power source from the circuit entirely. In many of these same applications a manual push-to-reset over-current snap-action circuit breaker is a preferred method of protecting the circuit from damage by electrical currents exceeding the design limits of the wiring, power sources, or loads.

Especially on low voltage applications, it is desirable to limit the loss of (drop in) voltage across any switching/protection devices in the circuit to reduce extraneous heating and power loss and to allow the most voltage to be available to the application load. With some combinations of voltage and current, it is both safer and more effective to create more than one arc gap when opening the circuit during overload protection and switching operations.

A single device which satisfies some or all of these criteria would provide benefits in terms of cost, space, voltage drop, simplicity-of-installation, and case-of-use. Embodiments described herein relate to switches including an integrated overcurrent protection device. In some embodiments, these switches are rotary switches, but the principles described herein may be applied to other types of switches, including but not limited to throw switches. In some embodiments, the integrated overcurrent protection device may be selectively engaged.

Figure 1B:
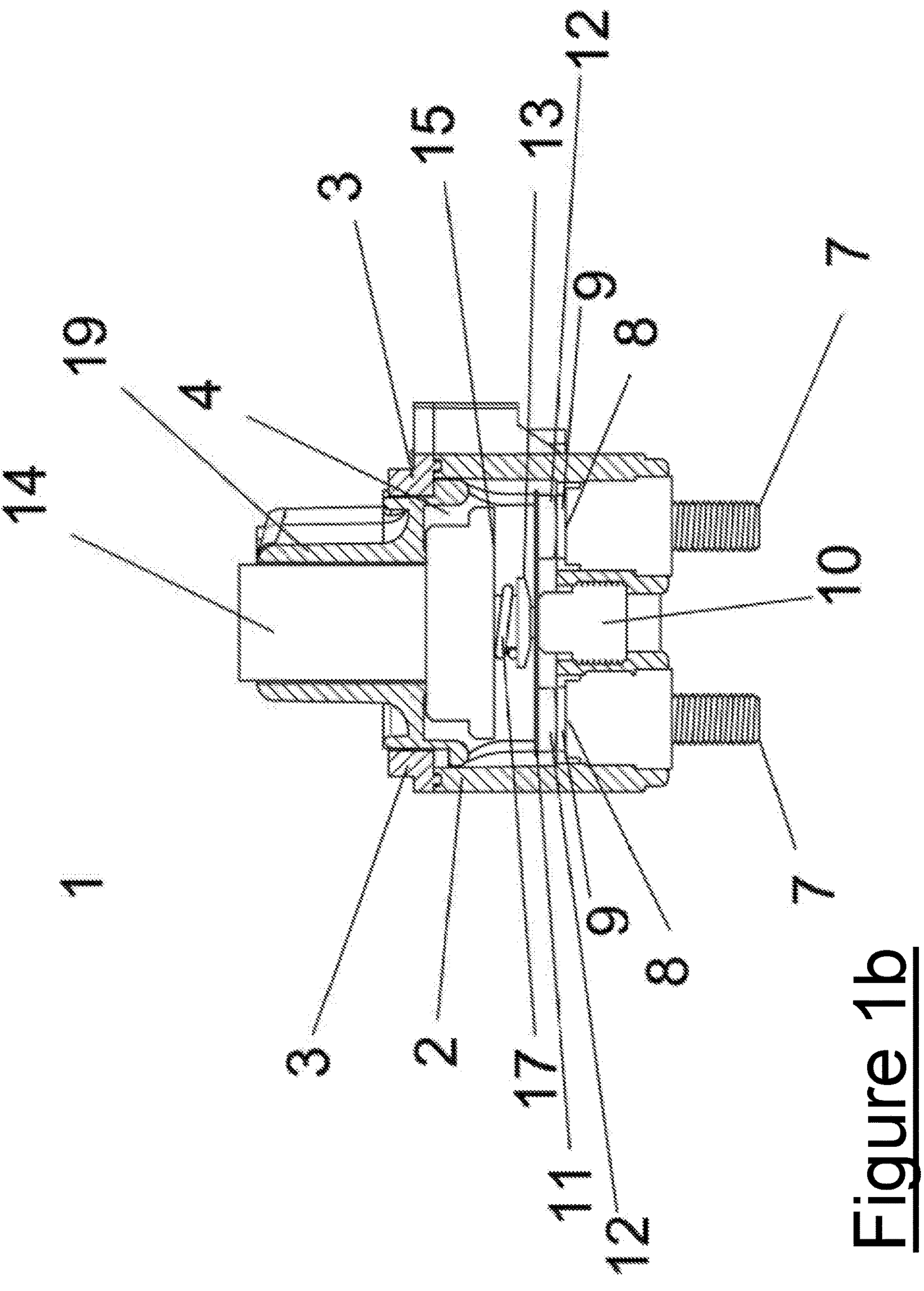
FIG. 1*b* is a side cross-sectional view of the rotary switch of FIG. 1*a*.
Figure 1C:
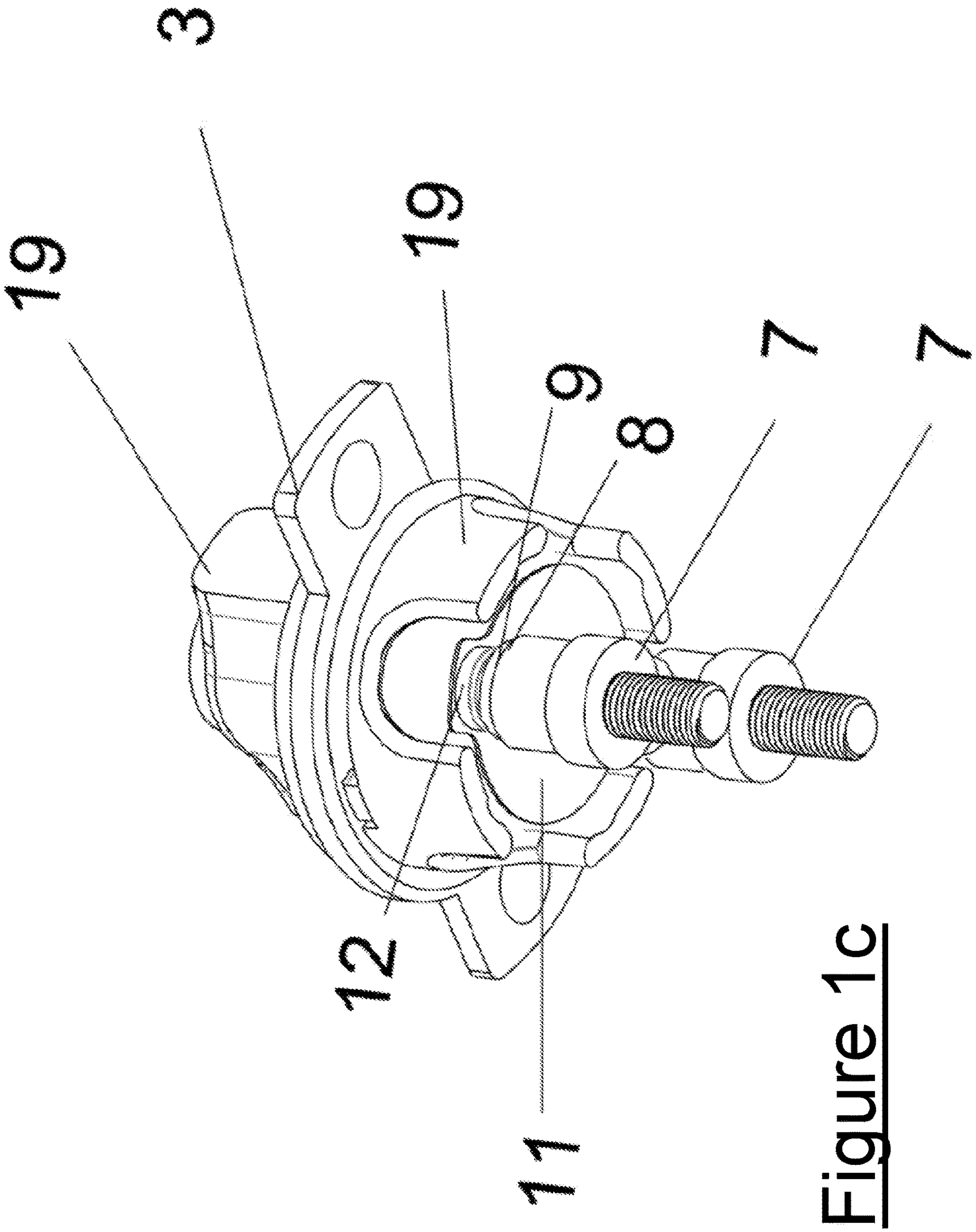
FIG. 1*c* is a perspective view of the rotary switch of FIG. 1*a*, shown from below, with a portion of the switch removed to expose the interior components of the rotary switch.

FIG. 1*a* is a perspective view of an embodiment of a rotary switch with an integrated overcurrent protection element, shown from above. FIG. 1*b* is a side cross-sectional view of the rotary switch of FIG. 1*a*. FIG. 1*c* is a perspective view of the rotary switch of FIG. 1*a*, shown from below, with a portion of the switch removed to expose the interior components of the rotary switch. The embodiment of device 1 illustrated in FIG. 1*a* may be an electric current responsive switching circuit breaker device. The base 2 may be cup shaped, as illustrated, although the shape and dimensions of the base may vary. The base 2 may be formed from or include an electrically insulating material.

As can be seen in FIG. 1*b*, the base 2 has at least one internal compartment 4 having an open end 5, as well as cover 3 which in the illustrated embodiment is generally flat. The cover 3 includes at least one through-hole 6. The cover 6 encloses the open end 5 of the base 2. Rivets 18 may be used to anchor the cover 3 and a gasket 16 to the base 2.

Electrically conducting terminals 7*a* and 7*b* extend through the base 2. In the illustrated embodiment, the device 1 includes two terminals 7*a* and 7*b*, but in other embodiments, additional terminals may be included. These terminals may be, for example, starter terminals. The terminals include electrical contact points 8*a* and 8*b* within the cup shaped portion of the base 2. In the illustrated embodiment, these electrical contact points 8*a* and 8*b* include stationary electrical contacts 9*a* and 9*b*. The device 1 also includes a center post 10, which in the illustrated embodiment is supported by a portion of base 2. In the illustrated embodiment, the central post 10 is secured in a threaded hole in the base 2, but may be supported in any other suitable fashion. The central post 10 may extend parallel to at least a portion of the electrical contacts 8*a* and 8*b*, but may be electrically isolated from the electrical contacts 8 when the device 1 is in the off position.

The center post 10 supports an overcurrent protection element 11, which in the illustrated embodiment is a bimetallic current-sensing element. In the illustrated embodiment, the central post 10 pierces the center of the overcurrent protection element 11, but other suitable support configurations may be possible as well. The overcurrent protection element 11 is held in position by a sleeve 13 within the base 2. The overcurrent protection element 11 includes two electrical contacts 12*a* and 12*b* at locations radially outward from the central post 10.

The overcurrent protection element 11 is formed such that, in response to Joule heating generated by electrical current flowing through the overcurrent protection element 11, the overcurrent protection element 11 will rapidly change shape and snap over center. In particular, the radially outward portions of the overcurrent protection element 11 will flex away from the stationary electrical contacts 9*a* and 9*b*.

When the overcurrent protection element 11 is not flexed in response to Joule heating generated by electrical current flowing through the overcurrent protection element 11, the overcurrent protection element 11 may be in a first position in which the electrical contacts 12*a* and 12*b* of the overcurrent protection element 11 are in contact with the stationary electrical contacts 9*a* and 9*b* of the device 1. In the illustrated embodiment, the overcurrent protection element 11 is in a generally planar configuration when in the first element, but in other embodiments, the first position may involve some curvature of the overcurrent protection element 11. In this first position, the overcurrent protection element 11 provides circuit continuity between the stationary electrical contacts 9*a* and 9*b* of the device 1

Figure 2:
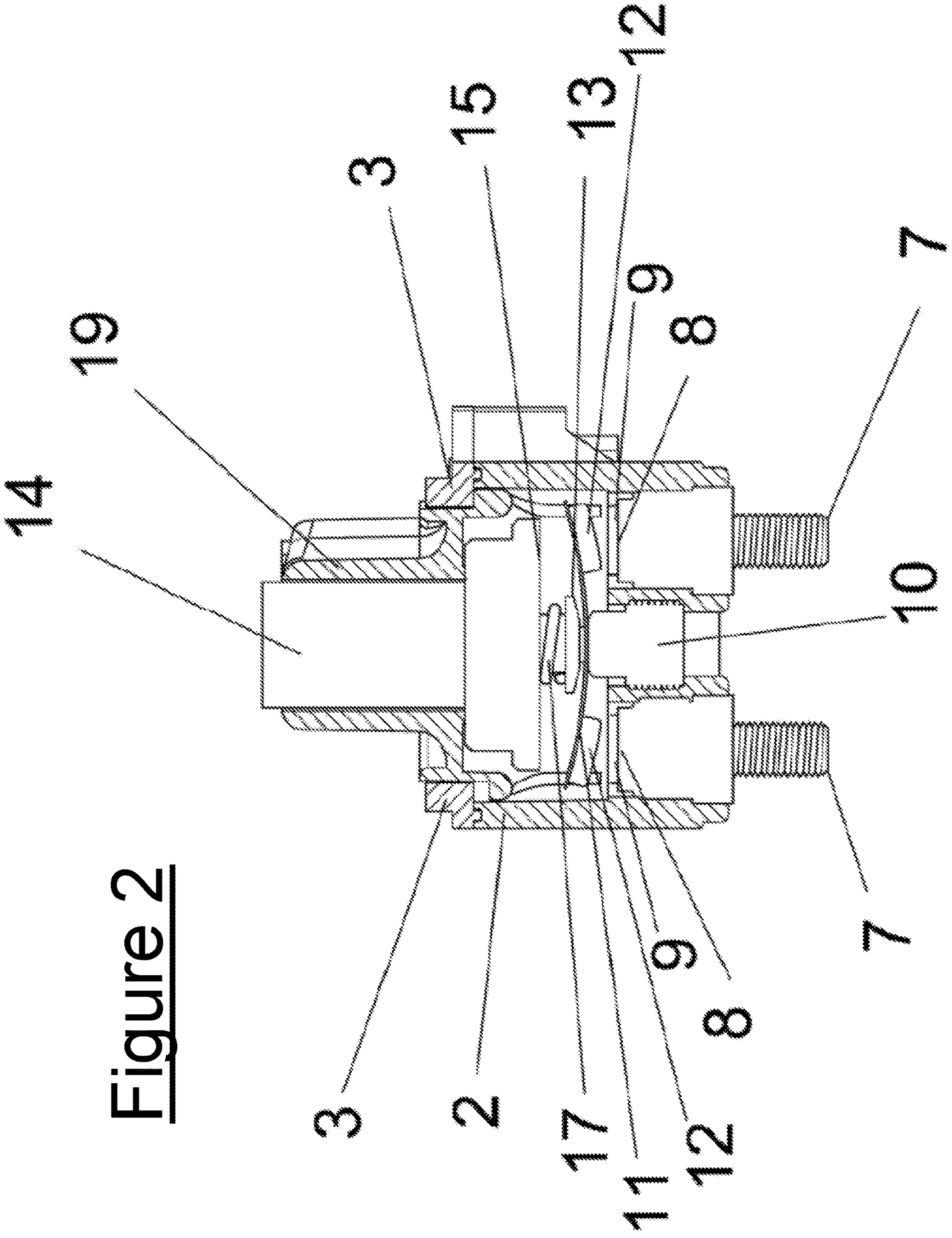
FIG. 2 is a side cross-sectional view of the rotary switch of FIG. 1*a*, with the overcurrent protection element shown in a tripped position.

FIG. 2 is a side cross-sectional view of the rotary switch of FIG. 1*a*, with the overcurrent protection element shown in a tripped position. When electrical current above a specified limit flows through the overcurrent protection element 11, the overcurrent protection element 11 responds to the Joule heating by rapidly changing shape to a second position in which the electrical contacts 12*a* and 12*b* of the overcurrent protection element 11 are spaced apart from and no longer in contact with the stationary electrical contacts 9*a* and 9*b* of the device 1. The overcurrent protection element therefore automatically separates the facing electrical contacts from one another in response to sufficient Joule heating and breaks the flow of current through the device 1. In some embodiments, the second position may only separate one of the electrical contacts 12*a* or 12*b* from the corresponding stationary electrical contact 9*a* or 9*b* of the device 1, but may still interrupt the flow of current through the device 1.

Figure 3:
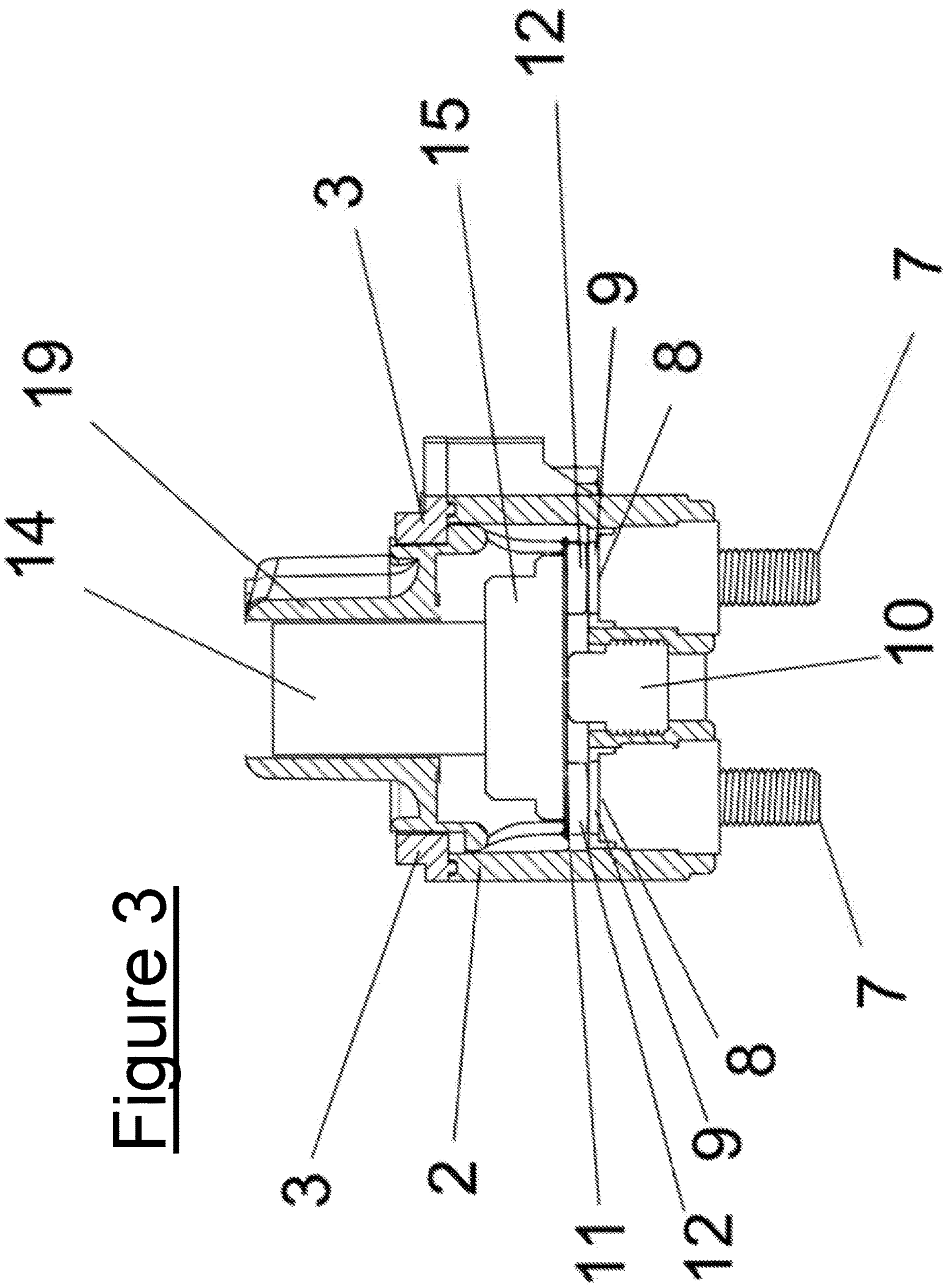
FIG. 3 is a side cross-sectional view of the rotary switch of FIG. 1*a*, with the overcurrent protection element shown in an untripped position.

In some embodiments, the device 1 may include a feature for manually resetting the overcurrent protection element 11 to the first position. FIG. 3 is a side cross-sectional view of the rotary switch of FIG. 1*a*, in which the reset button 14 has been manually depressed to move the overcurrent protection element 11 back into an untripped position. The reset button 14 is operably connected to a reset plate 15. In the illustrated embodiment, the reset button 14 and the reset plate 15 are axially aligned with the center post 10 supporting the overcurrent protection element 11. The reset button 14 protrudes through the sealing gasket 16 and cover through-hole 6 of the cover 3 which encloses the open side of the base 2. After the manual reset operation is completed, a return spring 17 serves to return said reset button 14 and reset plate 15 to their original position by biasing these elements against the cover 3, as can be seen in FIG. 1*b*. If the overcurrent protection element 11 has not been sufficiently cooled from the Joule heating which tripped the overcurrent protection element 11 to the second position, the overcurrent protection element 11 will immediately flex back to the second position.

Figure 4A:
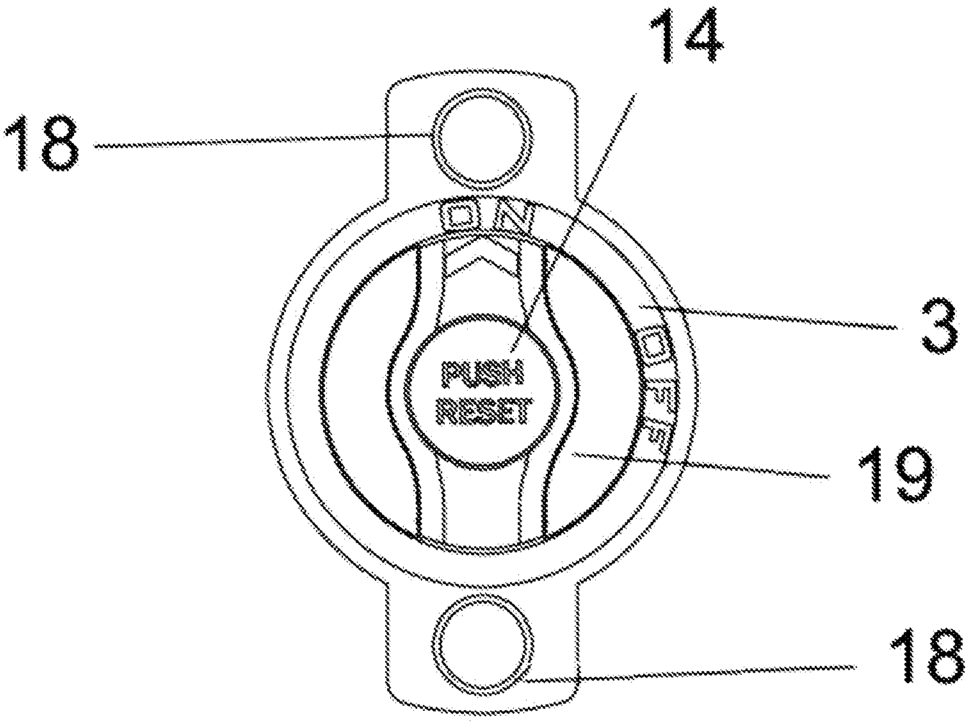
FIG. 4*a* is a top plan view of the rotary switch of FIG. 1*a*, with the switch in the "on" position.
Figure 4B:
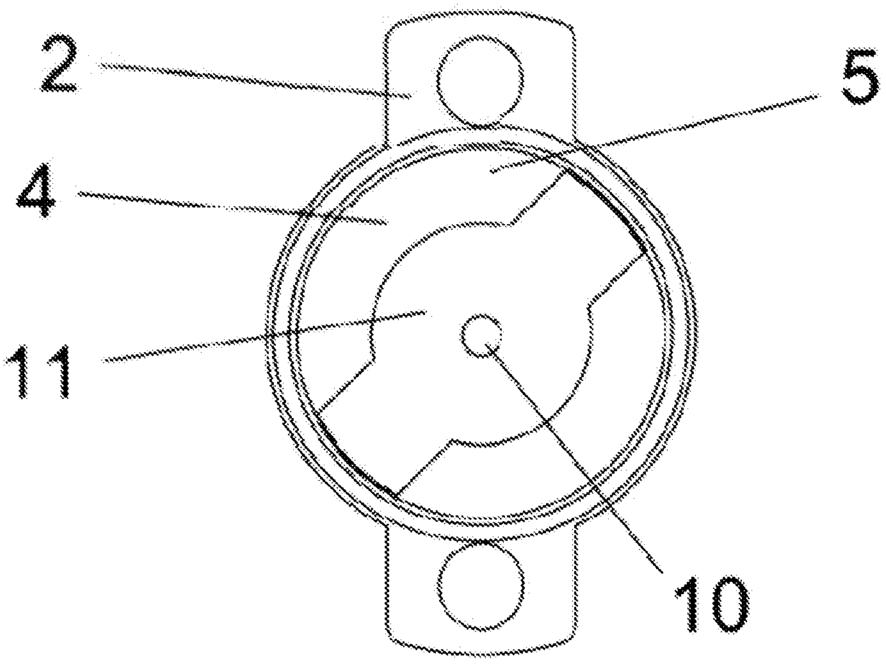
FIG. 4*b* shows the position of the overcurrent protection element with the switch in the "on" position.
Figure 5A:
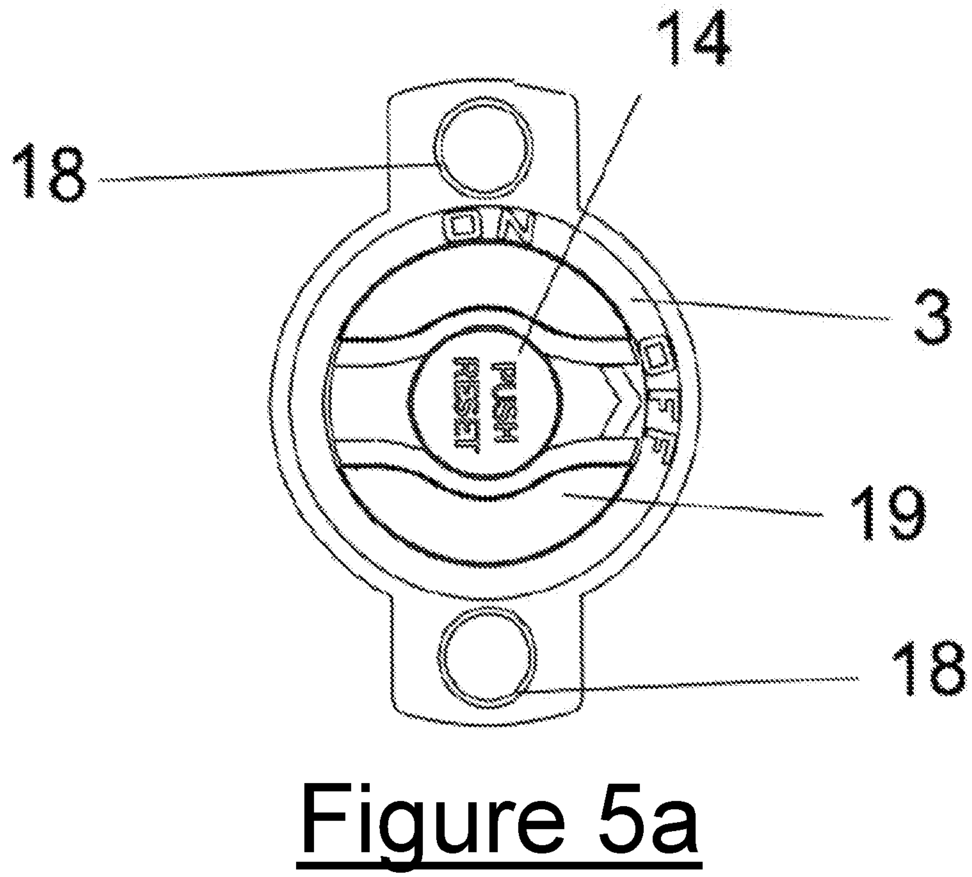
FIG. 5*a* is a top plan view of the rotary switch of FIG. 1*a*, with the switch in the "off" position.
Figure 5B:
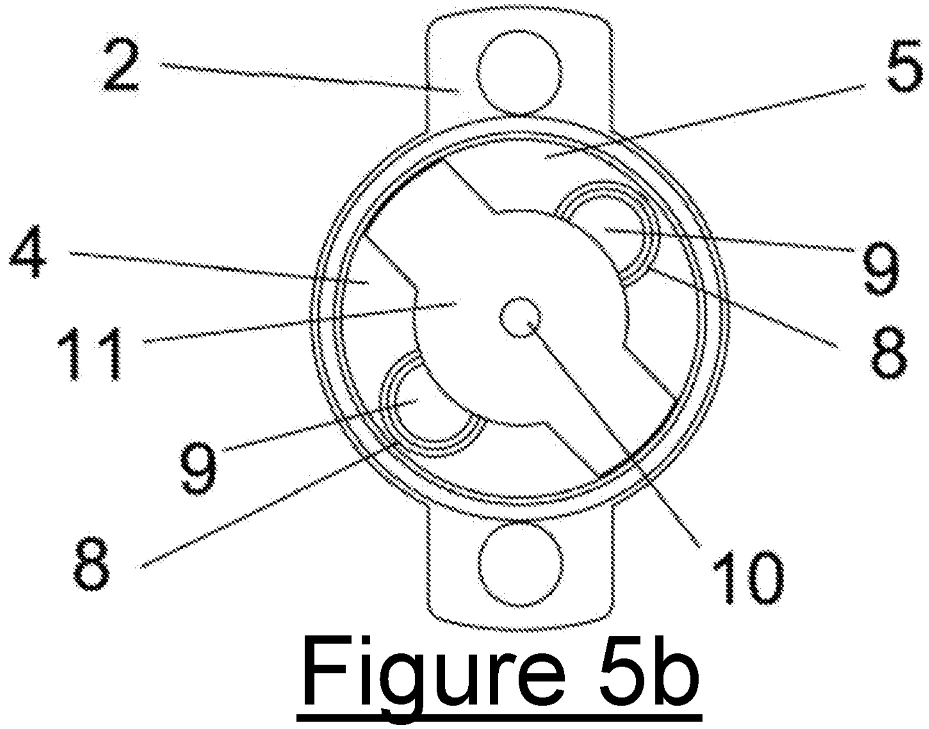
FIG. 5*b* shows the position of the overcurrent protection element with the switch in the "off" position, expositing the stationary contacts of the circuit.

FIG. 4*a* is a top plan view of the rotary switch of FIG. 1*a*, with the switch in the "on" position. FIG. 4*b* shows the position of the overcurrent protection element with the switch in the "on" position. FIG. 5*a* is a top plan view of the rotary switch of FIG. 1*a*, with the switch in the "off" position. FIG. 5*b* shows the position of the overcurrent protection element with the switch in the "off" position, expositing the stationary contacts of the circuit.

The device 1 includes a switching knob 19 concentric with the reset button 14 and extending through the gasket 16 and the through-hole 6 of the cover 3. The knob 19 can be manually rotated to either of the "on" or "off" positions. These positions may be defined by a series of detents 23 in the base 2. The gasket, sleeve, spring, reset plate, knob, button and cover are not shown in FIG. 4*b* or 5*b*, allowing the position of the overcurrent protection element 11 to be seen.

Manual rotation of the knob 19 pushes on the edges of the overcurrent protection element 11, rotating the overcurrent protection element 11 about the center post Manually rotating the knob 19 into the "ON" position, depicted in FIGS. 4*a* and 4*b*, electrical contact is established between the two element contacts 12*a* and 12*b* of the overcurrent protection element 11 and the two stationary contacts 9*a* and 9*b* of the device 1, thereby establishing a continuous electrical circuit through the overcurrent protection element 11 and the terminals 7*a* and 7*b*.

Manually rotating the knob 19 into the "OFF" position, depicted in FIGS. 5*a* and 5*b*, rotates the overcurrent protection element 11 to a position in which the overcurrent protection element 11 does not overly the stationary contacts 9*a* and 9*b* of the device 1, thereby opening the electrical circuit through the device 1.

Figure 6A:
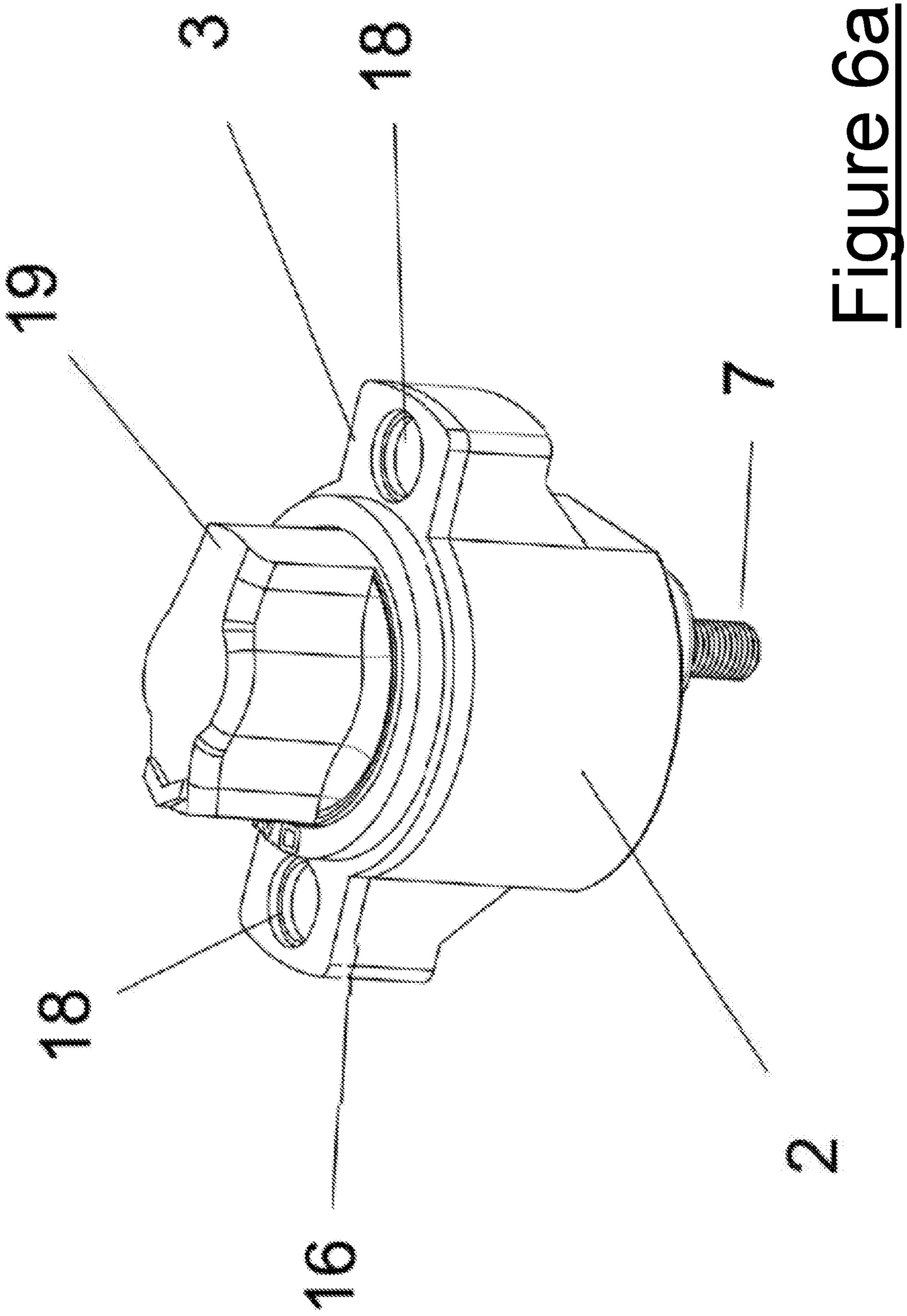
FIG. 6*a* is a perspective view of another embodiment of a rotary switch with an integrated overcurrent protection element, shown from above, without a reset button or other element to reset the overcurrent protection element.
Figure 6B:
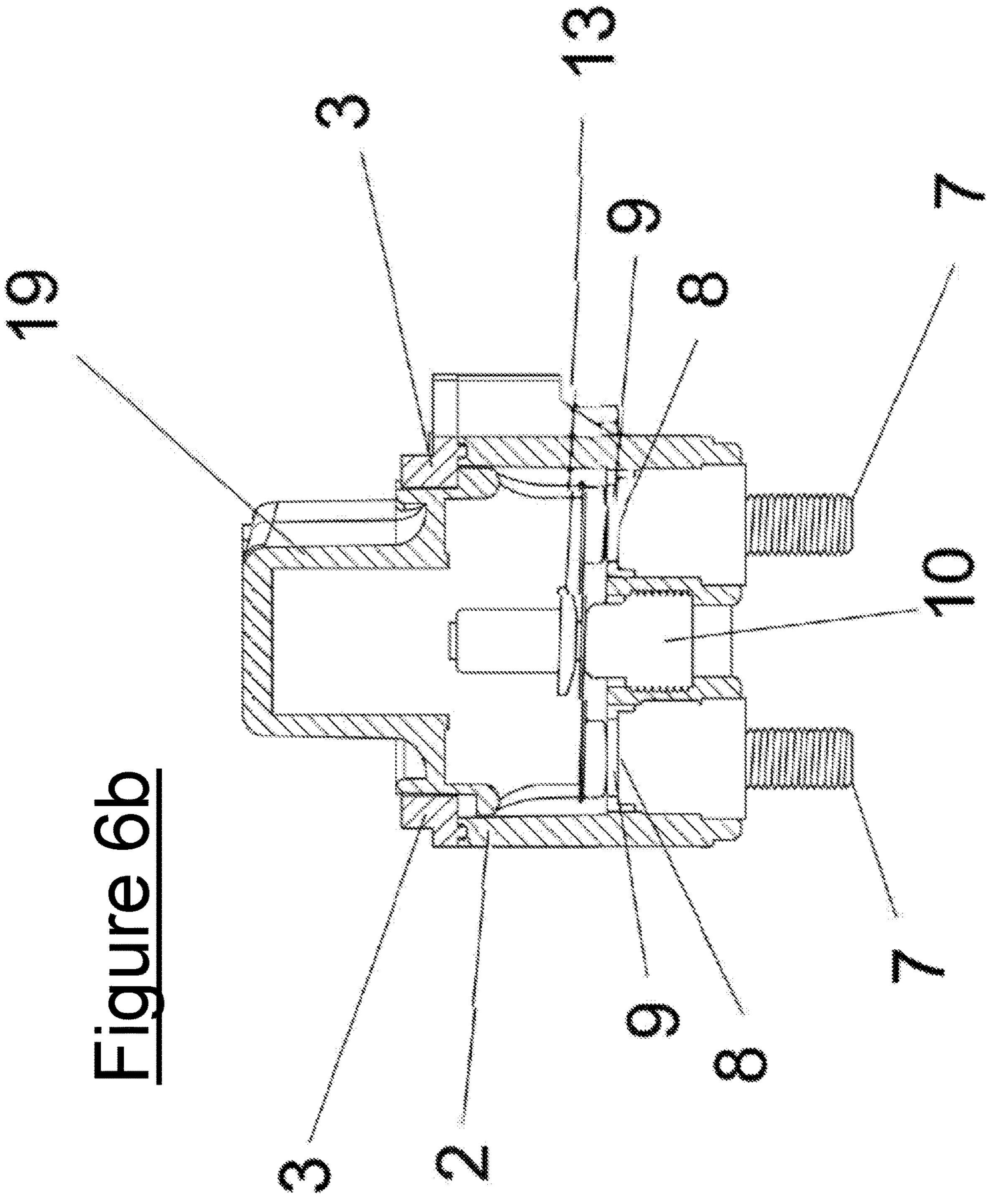
FIG. 6*b* is a side cross-sectional view of the rotary switch of FIG. 6*a*.

In some embodiments, a device may include an overcurrent protection element without a component configured to allow a user to manually reset the overcurrent protection element. FIG. 6*a* is a perspective view of another embodiment of a rotary switch with an integrated overcurrent protection element, shown from above, without a reset button or other element to reset the overcurrent protection element. FIG. 6*b* is a side cross-sectional view of the rotary switch of FIG. 6*a*. The device 1' of FIG. 6*b* does not include a reset button or reset plate, and the knob 19 does not include a through hole allowing passage of such a reset button. Instead, the overcurrent protection element 11 may be designed, such as through the use of integral bias, to move back to the first position when the overcurrent protection element 11 has sufficiently cooled from the Joule heating which triggered the flexure to the second position. The circuit of the device 1' will therefore automatically reopen on its own, in such an embodiment.

FIG. 7 shows multiple views of a switch cover which can be used with a rotary switch described herein. In the illustrated embodiment, the switch cover does not have a through hole for a reset button, but in other embodiments, the switch cover may have a through hole for a reset button or other component.

Various other configurations may also be used. In some embodiments, one of the connections between the overcurrent protection element 11 and a terminal may be a direct connection, such as a pin or a rivet, attaching that end of the overcurrent protection element 11 to a terminal or a conductive component electrically connected to that terminal. Only the other end of the overcurrent protection element 11 may thus move in response to an electrical current above the specified limit. In some embodiments, the pin or rivet may be axially aligned with the axis of rotation of the knob. In such an embodiment, twitching to the "ON" or "OFF" positions may be accomplished by manually rotating the switching actuator knob, thereby rotating the overcurrent protection element around such a pin or rivet to move the single electrical contact pair in or out of contact, thereby closing or opening the electrical circuit.

In other embodiments, the overcurrent protection element 11 may include a fuse clip and a cartridge fuse, or another type of fuse or overcurrent protection element, instead of or in addition to a bimetallic element with contact points. Any other suitable overcurrent protection element may be used in place of or in addition to the bimetallic element.

Figure 8A:
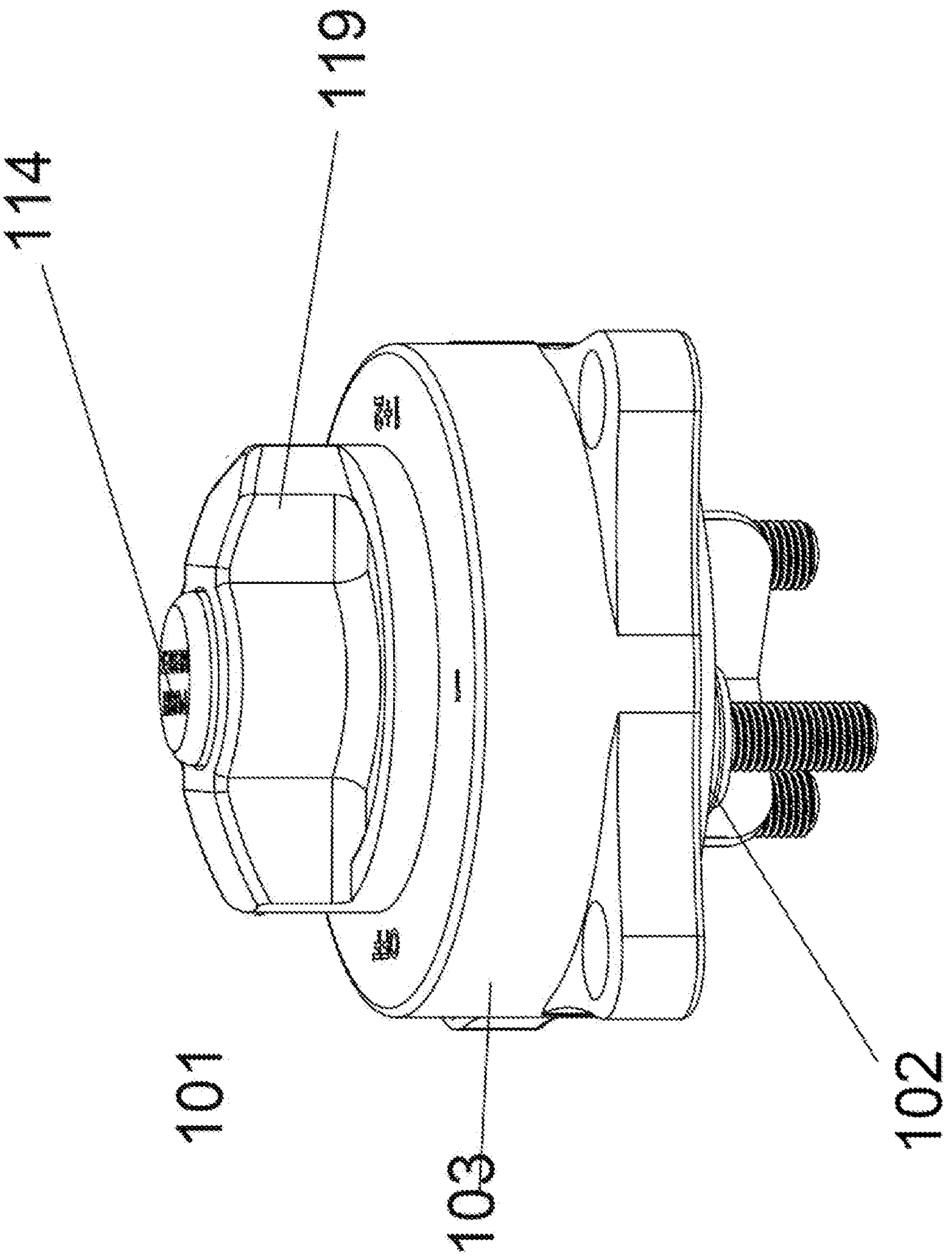
FIG. 8*a* is a perspective view of an embodiment of a rotatable multi-pole switch, shown from above.
Figure 8B:
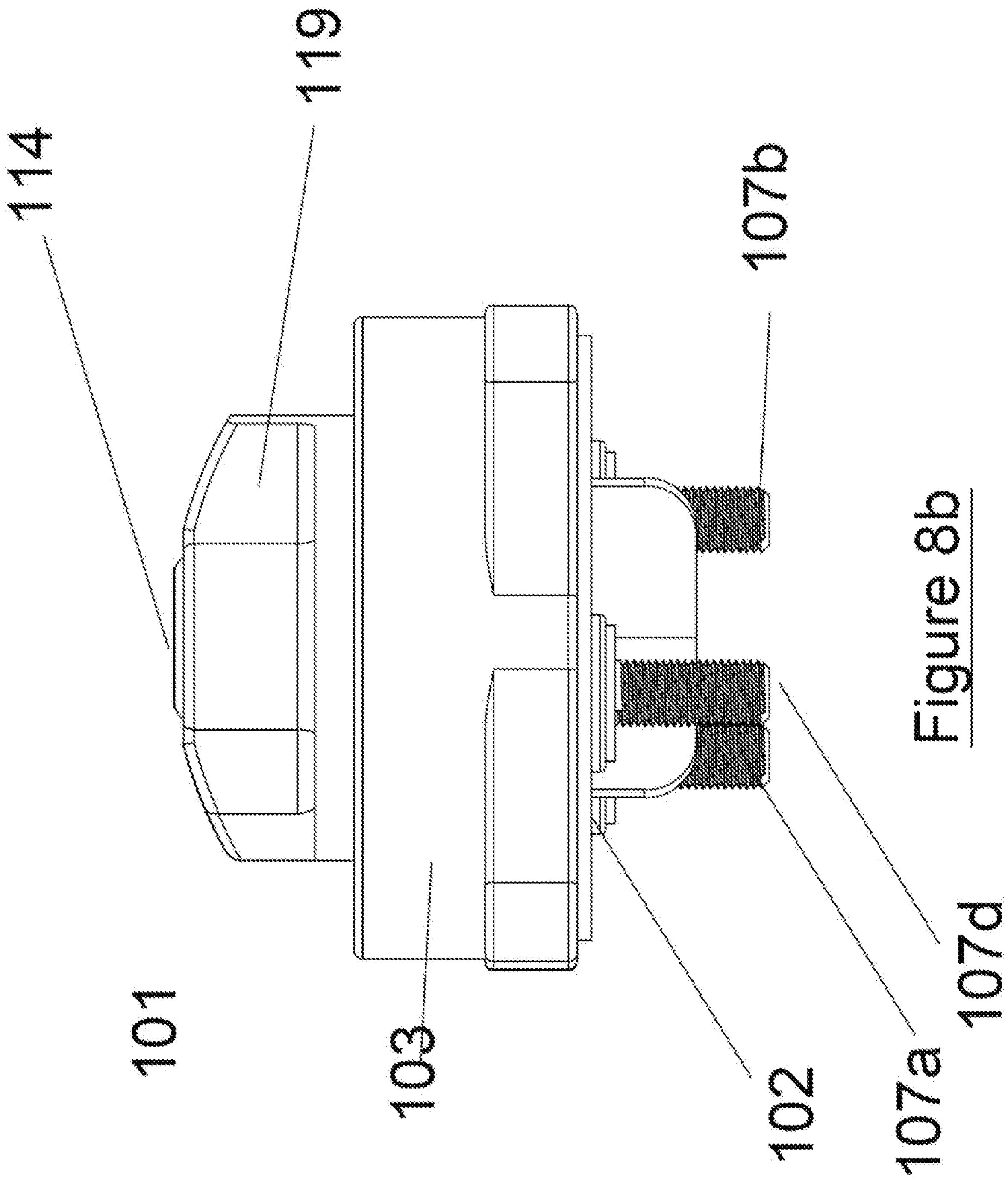
FIG. 8*b* is a side view of the rotatable multi-pole switch of FIG. 8*a*.
Figure 8C:
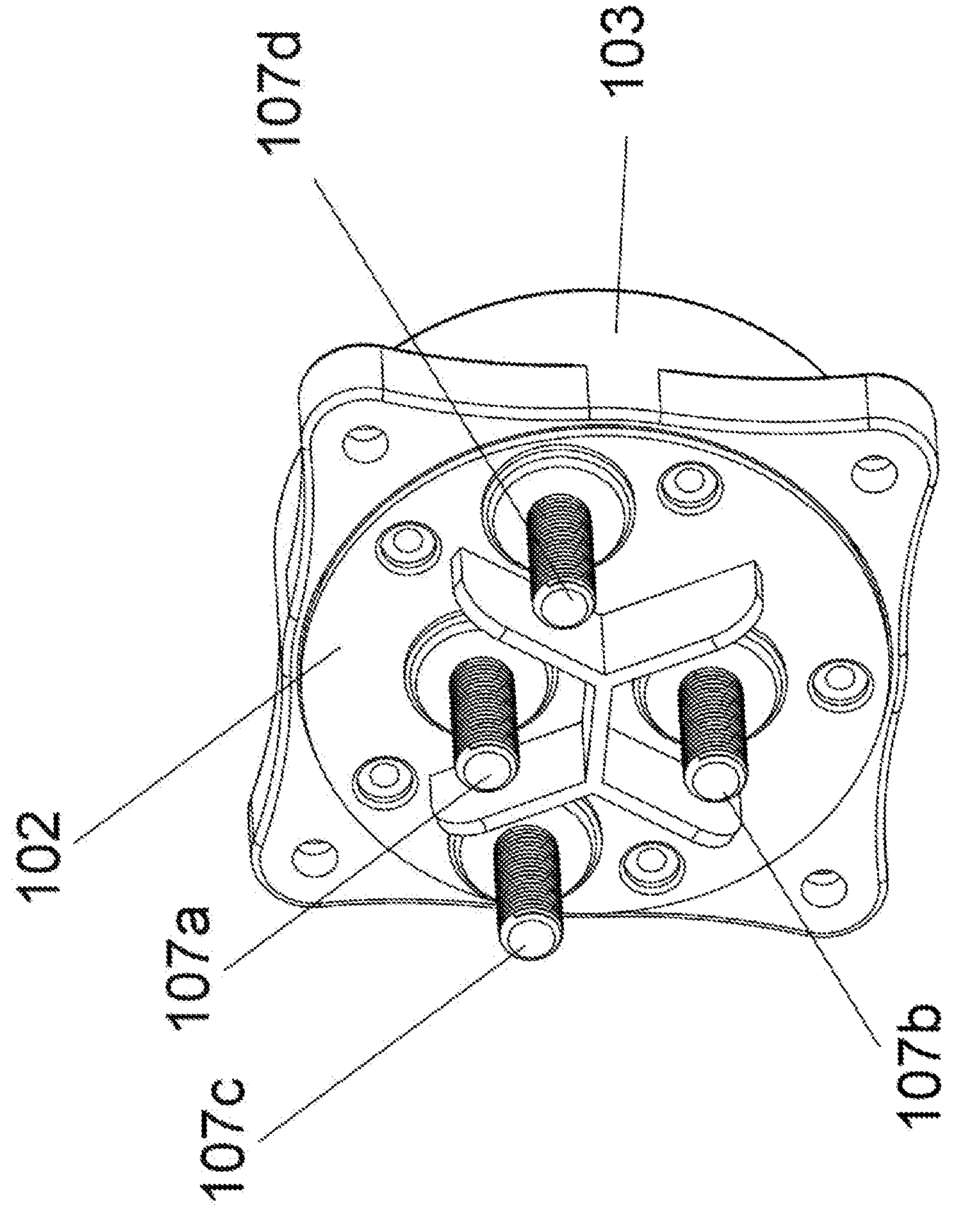
FIG. 8*c* is a perspective view of the rotatable multi-pole switch of FIG. 8*a*, shown from below.
Figure 9:
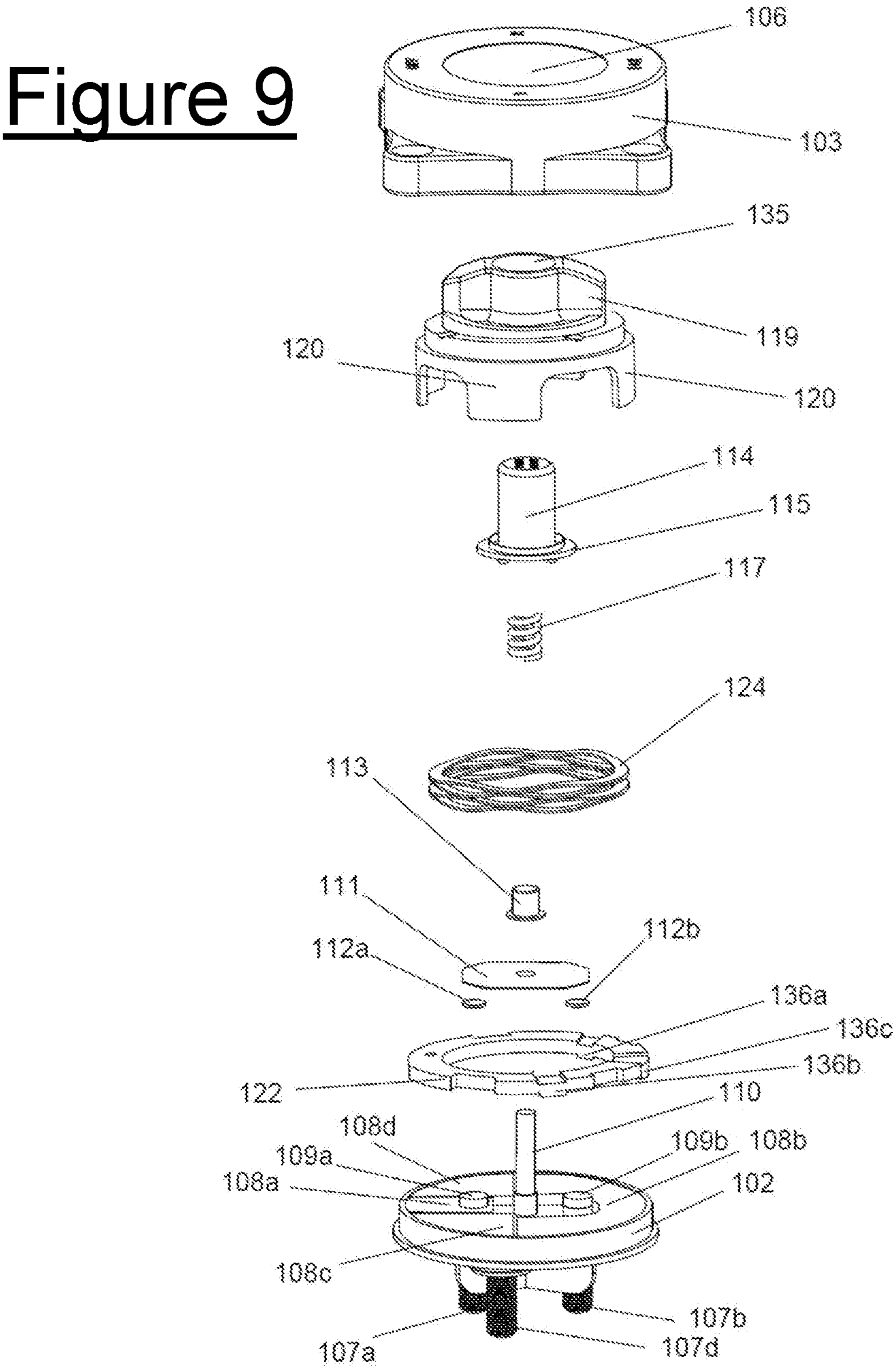
FIG. 9 is an exploded assembly view of the rotatable multi-pole switch of FIG. 8*a*.

In other embodiments, a multi-pole switch may include an integrated overcurrent protection element. FIG. 8*a* is a perspective view of an embodiment of a rotatable multi-pole switch, shown from above. FIG. 8*b* is a side view of the rotatable multi-pole switch of FIG. 8*a*. FIG. 8*c* is a perspective view of the rotatable multi-pole switch of FIG. 8*a*, shown from below. FIG. 9 is an exploded assembly view of the rotatable multi-pole switch of FIG. 8*a*.

The exterior of the device 101 is similar in some ways to the device 1 of FIG. 1*a*, but differs in that the device 101 includes four terminals 107*a*, 107*b*, 107*c*, and 107*d* extending into the device 101 through the base 102. The device 101 includes a generally flat base 102 and a generally cup-shaped cover 103 having an internal compartment 104, an open end 105 and at least one through-hole 106 extending through the cover 103.

Figure 11:
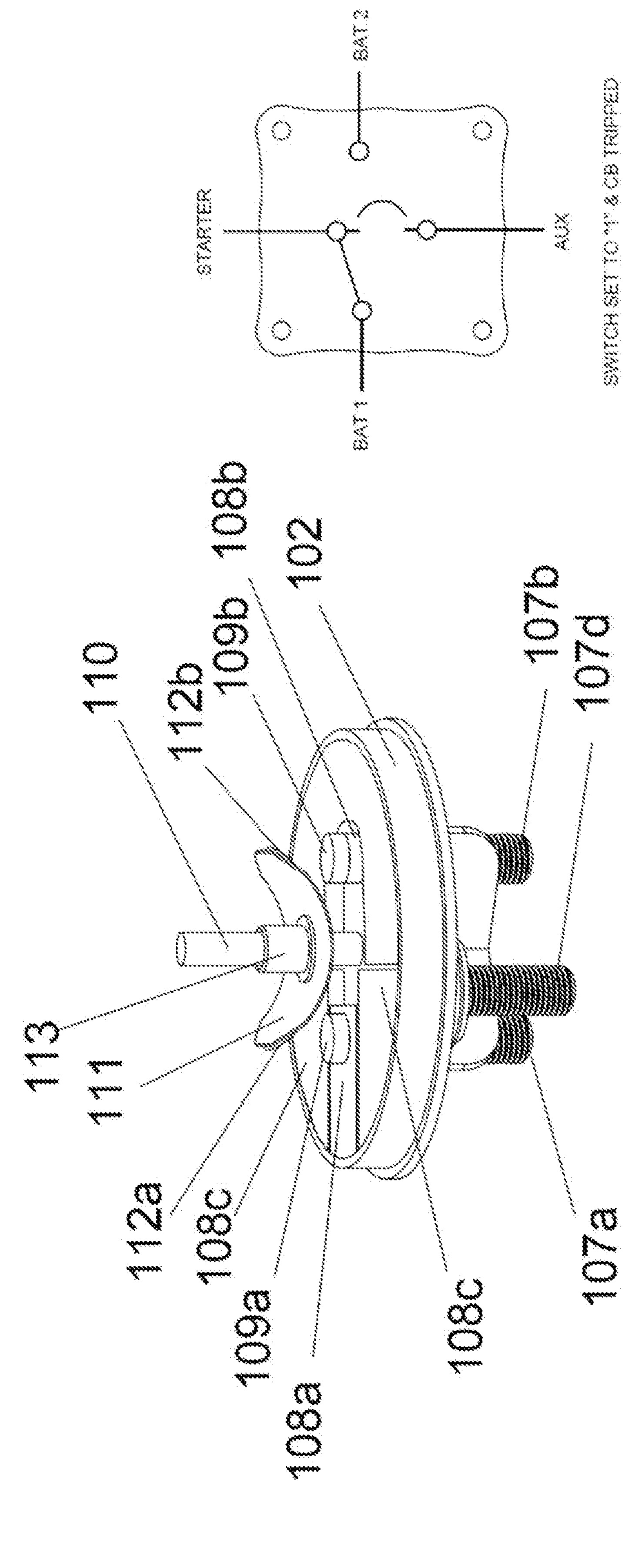
FIG. 11 is a perspective view of internal components of the rotatable multi-pole switch of FIG. 8*a*, with the overcurrent protection element in a tripped position.

In the illustrated embodiment, the base 102 has four terminals 107*a*, 107*b*, 107*c*, and 107*d* extending therethrough, but other embodiments may include fewer or additional terminals. Each of the terminals 107*a*, 107*b*, 107*c*, and 107*d* are electrically connected to respective electrical contact points 108*a*, 108*b*, 108*c*, and 108*d*. As can be seen in FIG. 8*c*, the terminals 107*a*, 107*b*, 107*c*, and 107*d* are generally located along one or more diameters of base 102 at 90 degrees to each other. Terminals 107*a* and 107*b* are generally aligned along a diameter of base 102, along a line perpendicular to and passing through a central axis of device 101. As can be seen in FIG. 11, electrical contact points 108*a* and 108*b* have stationary contact points 109*a* and 109*b* supported thereon.

In some embodiments, the device 101 is configured to be electrically connected to an engine starter circuit, an auxiliary circuit, and two batteries. The terminal 107*a* may be referred to as a starter terminal, the terminal 107*b* may be referred to as an auxiliary terminal, and the terminals 107*c* and 107*d* may be referred to respectively as battery terminals "1" and "2". Corresponding terminology may also be used for the corresponding electrical contact points and stationary contacts. The device 101 is not limited to use only in such an embodiment, but the use of this terminology is used herein to illustrate certain aspects of the operation of the device.

The base 102 also includes a center post 110 aligned with a central axis of the device 101. The center post 110 supports an overcurrent protection element 111 which may be a bimetallic current sensing element configured to change shape in response to heat generated by current flow therethrough and thereby protect the auxiliary circuit from electrical overload. The center post 110 may extend through the overcurrent protection element 111, which may be held in place on the center post 110 by a sleeve 113. The overcurrent protection element 111 includes two electrical contacts 112*a* and 112*b* supported thereon.

As can be seen in FIG. 9, the device 101 also includes a curved bus bar 122 which in the illustrated embodiment extends in an almost circular shape. The curved bus bar 122 is formed from a conductive material, and may be shaped to include a plurality of downwardly protruding sections 136 in which are lower than other recessed portions 123 (see FIG. 10*a*) of the bus bar 122.

The bus bar 122 is coupled to the knob 119 to rotate along with the knob 119. In the illustrated embodiment, the bus bar 122 includes two or more downwardly protruding sections, the spacing of which is illustrated with respect to FIGS. 10*a* to 10*d*.

A switching actuator knob 119 concentric to both the reset button 114 and the cover through hole 106, protrudes through the cover through hole 106 to allow the knob 119 to be manually rotated. The rotation of the knob 119 is transmitted to the bus bar 122 by one or more switching posts 120 to an electrically conducting, basically circle shaped, moving bus bar 122. The rotation of the knob 119 results in the rotation of the moving bus bar 122 around a rotational axis aligned with the center post 110.

Depending on the rotational position of the moving bus bar 122, electrical contact may be established by the moving bus bar 122 between one or more of the battery terminal contact points 108*c*, 108*d* and the starter terminal contact point 108*a*. Contact point 108*b* is electrically insulated from the moving bus bar 122, being imbedded within the insulating material of base 102. A range of positions may be defined by a series of detents in the cover 103. Electrical contact pressure may be maintained by one or more contact springs 124, thereby establishing one or more continuous electrical circuits between certain of the battery terminals 107*c* and 107*d* and starter terminal 107*a*. The knob 119 may also be manually rotated into the "OFF" position, rotating the bus bar 122 into contact with one or fewer of terminal contact points 108*a*, 108*c*, and 108*d*, thereby opening all electrical circuits as shown in FIG. 10*d*.

Figure 10A:
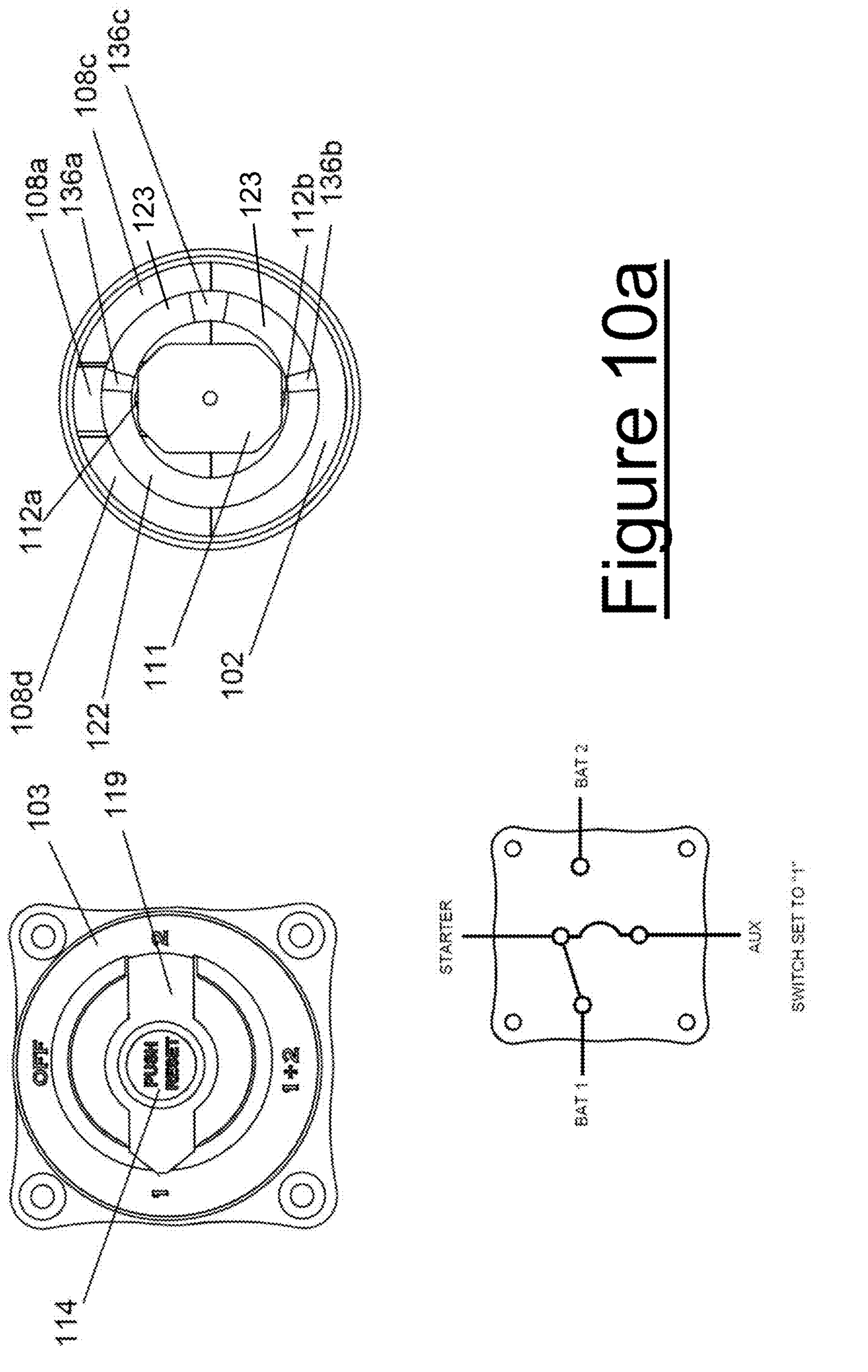
FIG. 10*a* is a top plan view of the rotatable multi-pole switch of FIG. 8*a*, with the switch in the "1" position.
Figure 10B:
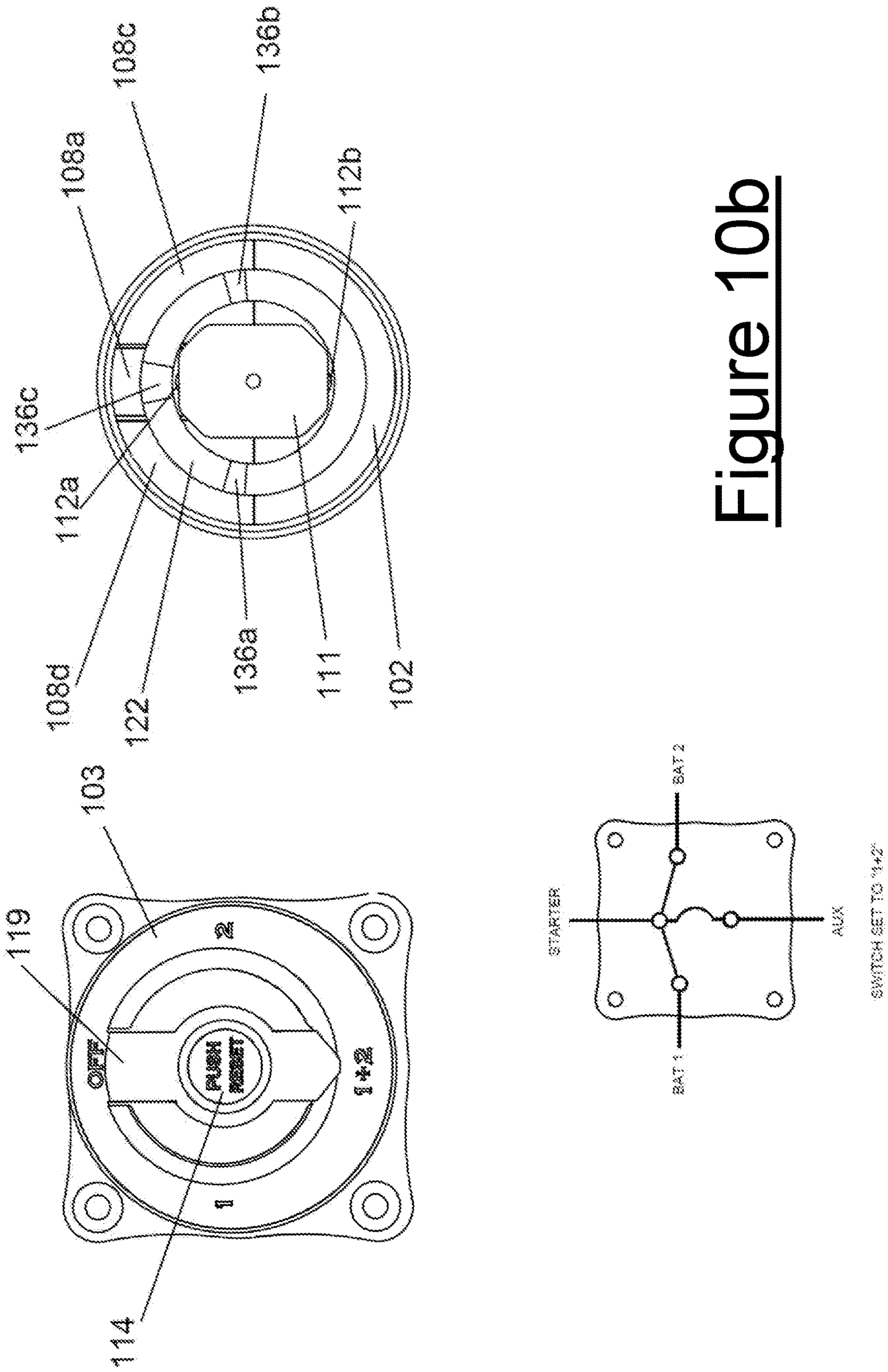
FIG. 10*b* is a top plan view of the rotatable multi-pole switch of FIG. 8*a*, with the switch in the "1+2" position.
Figure 10C:
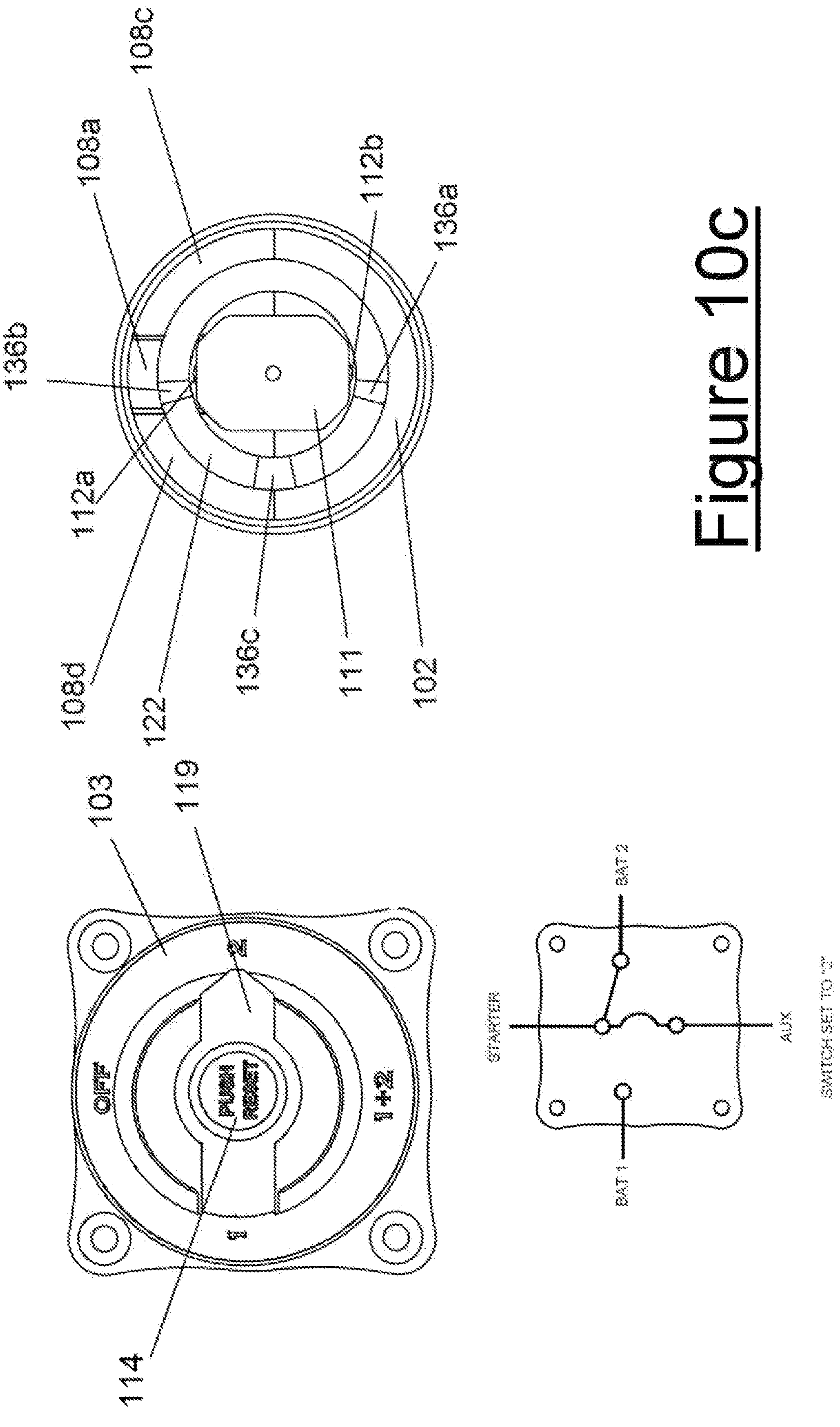
FIG. 10*c* is a top plan view of the rotatable multi-pole switch of FIG. 8*a*, with the switch in the "2" position.
Figure 10D:
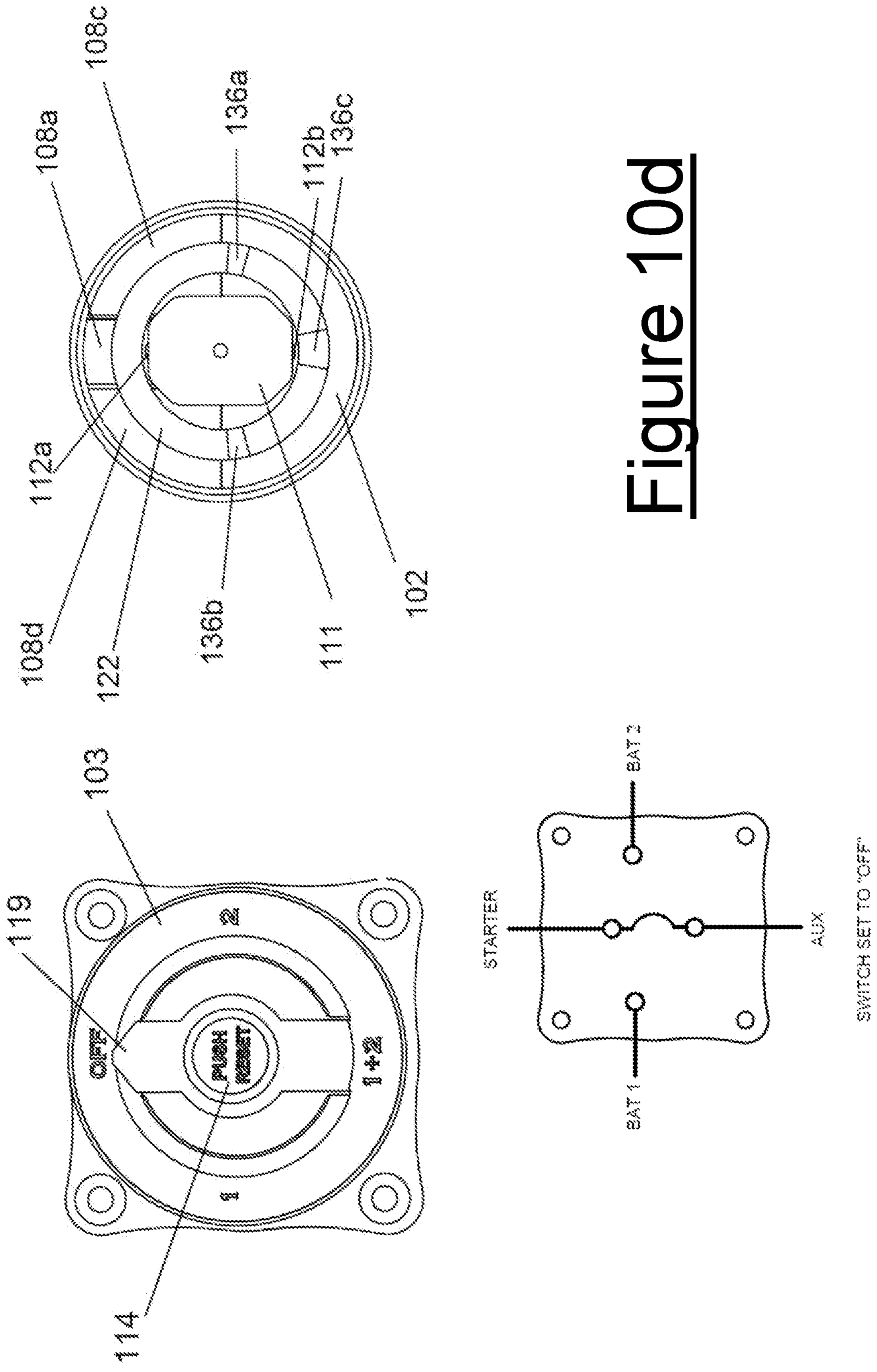
FIG. 10*d* is a top plan view of the rotatable multi-pole switch of FIG. 8*a*, with the switch in the "Off" position.

When device 101 is in any closed position as shown in FIGS. 10*a*, 10*b*, and 10*c*, current may be conducted from one (as shown in positions illustrated in FIGS. 10*a*, and 10*c*) or more (as shown in the position illustrated in FIG. 10*b*) of the battery terminals 107*c*, 107*d* through one or more of the battery terminal contact points 108*c*, 108*d*, through the electrically conducting movable bus bar 122, to the starter terminal contact point 108*a*. From the starter terminal contact point 108*a*, current may flow through the starter terminal 107*a* to the starter circuit and also through one pair of contacts 109*a* and 112*a*, through the bimetallic element 111, through the second pair of contacts 112*b* and 109*b* through the auxiliary contact point 108*b*, through auxiliary terminal 107*b*, to the auxiliary circuit.

FIG. 10*a* is a top plan view of the rotatable multi-pole switch of FIG. 8*a*, with the switch in the "1" position. FIG. 10*a* also shows an internal top plan view of the position of certain internal elements with the switch in the "1" position and a simple electrical schematic diagram of the internal circuit. The bus bar 122 is rotated to a position in which one of the downwardly protruding sections 136*a* overlies and is in contact with electrical contact point 108*a*, and another of the downwardly protruding sections 136*c* overlies and is in contact with electrical contact point 108*c*. Contact between the bus bar 122 and the electrical contact points 108*a* and 108*c* may be maintained by one or more springs 124, which bias the bus bar 122 against the underlying electrical contact points. Current may therefore flow from battery terminal 107*c* associated with the first battery, through electrical contact point 108*c*, through the bus bar 122 to the starter terminal contact point 108*a*. From there, current may flow through the starter terminal 107*a* into the starter circuit. Current may also flow into the auxiliary circuit through the overcurrent protection element 111*a* and the auxiliary terminal 107*b*, as discussed above.

FIG. 10*b* is a top plan view of the rotatable multi-pole switch of FIG. 8*a*, with the switch in the "1+2" position. FIG. 10*b* also shows a top plan view of the position of certain internal elements with the switch in the "1+2" position and a simple electrical schematic diagram of the internal circuit. The bus bar 122 is rotated to a position in which each of the downwardly protruding sections of the bus bar 122 is in contact with a different underlying electrical contact point. In particular, one of the downwardly protruding sections 136*b* overlies and is in contact with electrical contact point 108*c*, one of the downwardly protruding sections 136*c* overlies and is in contact with electrical contact point 108*a*, and another of the downwardly protruding sections 136*a* overlies and is in contact with electrical contact point 108*d*. In the "1+2" position illustrated in FIG. 10*b*, current may also flow through the through the moving bus bar 122 from the terminal 107*c* associated with the first battery to the terminal 107*d* associated with the second battery, or from the terminal 107*d* to the terminal 107*c*, by means of contact between the moving bus bar 112 and the respective terminal contact points 108*c* and 108*d*. Current may also flow into the auxiliary circuit through the overcurrent protection element 111 and the auxiliary terminal 107*b*, as discussed above.

FIG. 10*c* is a top plan view of the rotatable multi-pole switch of FIG. 8*a*, with the switch in the "2" position. FIG. 10*c* also shows a top plan view of the position of certain internal elements with the switch in the "2" position and a simple electrical schematic diagram of the internal circuit. The bus bar 122 is rotated to a position in which one of the downwardly protruding sections 136*b* overlies and is in contact with electrical contact point 108*a*, and another of the downwardly protruding sections 136*c* overlies and is in contact with electrical contact point 108*d*. In addition to flowing to the starter and auxiliary circuits, current may flow through the bus bar 122 from battery terminal 107*d* associated with the second battery to the starter terminal contact point 108*a*. From there, current may flow into the starter circuit. Current may also flow into the auxiliary circuit through the overcurrent protection element 111*a* and the auxiliary terminal 107*b*, as discussed above.

When the switch is rotated into the top "OFF" position of FIG. 10*d*, the bus bar 122 will be in a position where it makes no electrical contact with the electrical contact points associated with the first or second batteries, or the starter elements. In such a position, no current is allowed to flow through the bus bar 122.

In the illustrated embodiment, because the arc of the bus bar 122, is supported only by the downwardly protruding sections 136, the bus bar 122 can be moved to a position where the downwardly protruding sections 136 only contact the insulating material of the base 102 and the bus bar 122 overlies, but does not come into electrical contact with, the electrical contact points 108*a*, 108*c*, or 108*d*. The off-center positioning of battery terminals 107*c* and 107*d* and their associated contact points 108*c* and 108*d* provides additional clearance for the "OFF" position, ensuring that no undesired electrical contact is made.

FIG. 11 is a perspective view of internal components of the rotatable multi-pole switch of FIG. 8*a*, with the overcurrent protection element in a tripped position. FIG. 11 also shows a simple electrical schematic diagram of the internal circuit with the switch in the "1" position and the overcurrent protection element in a tripped position. When electrical current above a specified limit flows through the overcurrent protection element 111, the overcurrent protection element 111 responds to the Joule heating by rapidly changing shape from a first position in which the electrical contacts 112*a* and 112*b* are in contact with stationary contacts 109*a* and 109*b*, to a second position in which at least one of the pairs of contacts is separated, breaking the flow of current between "starter" terminal 107*a* and "auxiliary" terminal 107*b*, as shown in FIG. 11.

When sufficiently cooled from the Joule heating, the overcurrent protection element 111 can be manually reset to its original position, bringing the electrical contacts 112*a* and 112*b* back into contact with stationary contacts 109*a* and 109*b* and reestablishing circuit continuity between "starter"

terminal 107*a* and "auxiliary" terminal 107*b*. This reset operation may be performed by manually depressing the reset button 114, which protrudes through the through hole 135 in the knob 119 (see FIG. 9), thereby also depressing the reset plate 115 concentrically positioned on the center post 110 onto the overcurrent protection element 111. This forces the overcurrent protection element 111 back into its original position. The button return spring 117, axially aligned and with and concentric with the center post 110, serves to return the reset button 114 and reset plate 115 to their original position against the internal compartment of the cover 104 after this manual reset operation. One or more rivets (not shown) or a snap-type friction fit may be used to anchor the cover 103 to the base 102.

In another embodiment, the device 101 may not include the reset button 114 and reset plate 115, and there is no need to include the corresponding switching actuator knob through hole 135. In such an embodiment, the overcurrent protection element 111 may be designed such that, after cooling sufficiently from Joule heating, the element will automatically return from the open second position to its original first position, reclosing the electrical circuit.

In another embodiment of the device 101, one pair of contacts between the overcurrent protection element 111 and mating stationary contact (such as the pair of contacts 112*a* and 109*a* or the pair of contacts 112*b* and 109*b*), is replaced by a weld or rivet, attaching that end of the overcurrent protection element 111 to a terminal contact point and using only the other pair of contacts to break the circuit when the overcurrent protection element 111 flexes in response to an electrical current above a specified limit.

In another embodiment of the device 101, the overcurrent protection element 111 and associated electrical contacts 112*a* and 112*b* may be replaced by a fuse clip and cartridge fuse, transferring the function of the over-current protection feature of the illustrated embodiments from an overcurrent protection element 111 in the form of a bimetallic element, to the cartridge fusc.

In another embodiment of the device 101, the starter terminal 107*a* may be removed, but the starter terminal contact point 108*a* is retained, forcing all current to flow through the overcurrent protection element 111 when in a closed position.

Figure 12A:
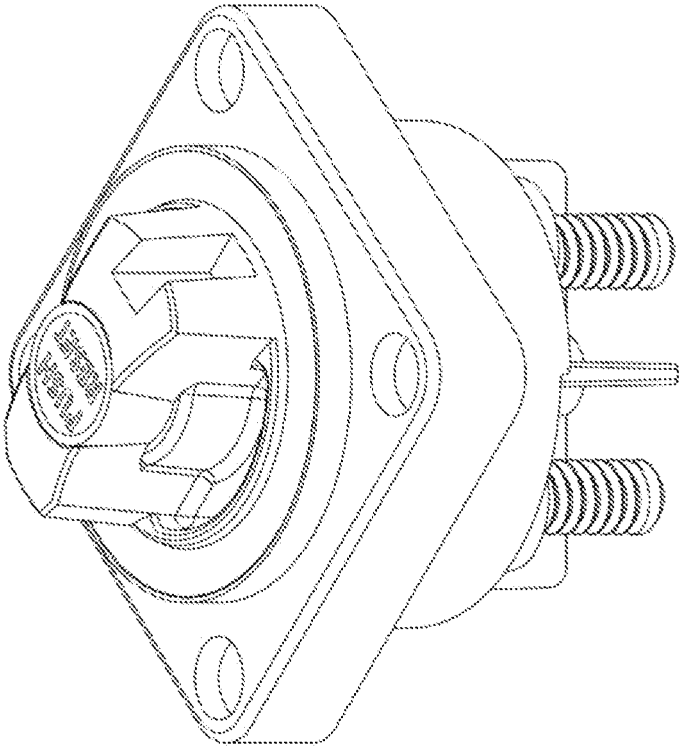
FIG. 12*a* is perspective view of another embodiment of a multi-pole switch, shown from above.
Figure 12B:
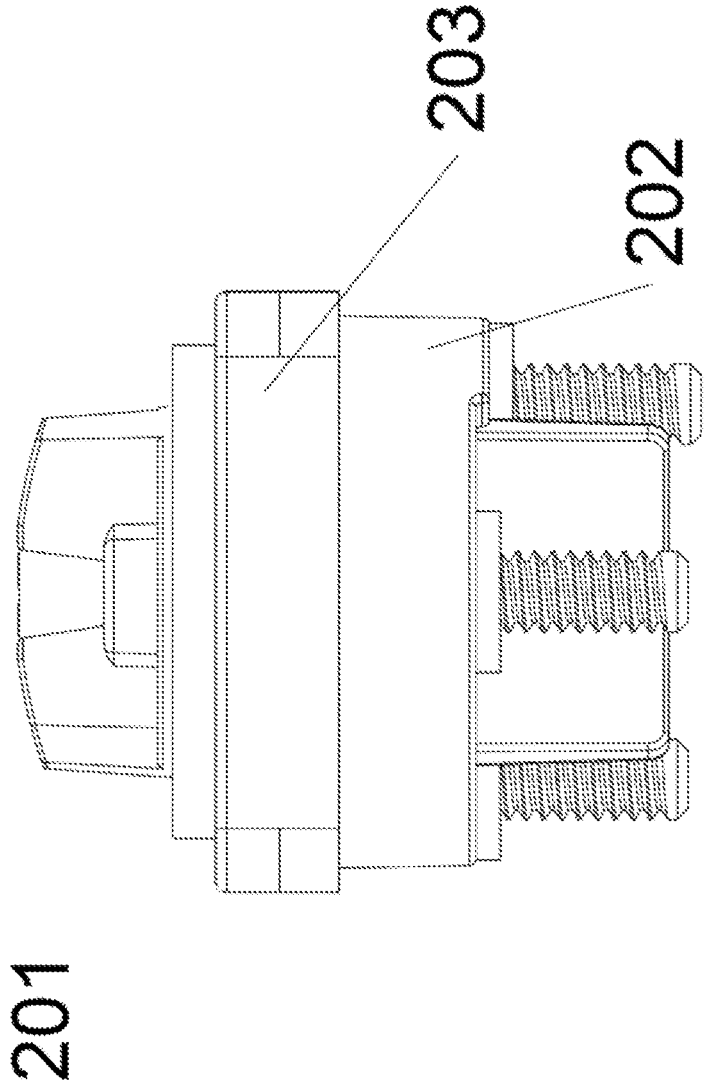
FIG. 12*b* is a side view of the embodiment of FIG. 12*a*.
Figure 12C:
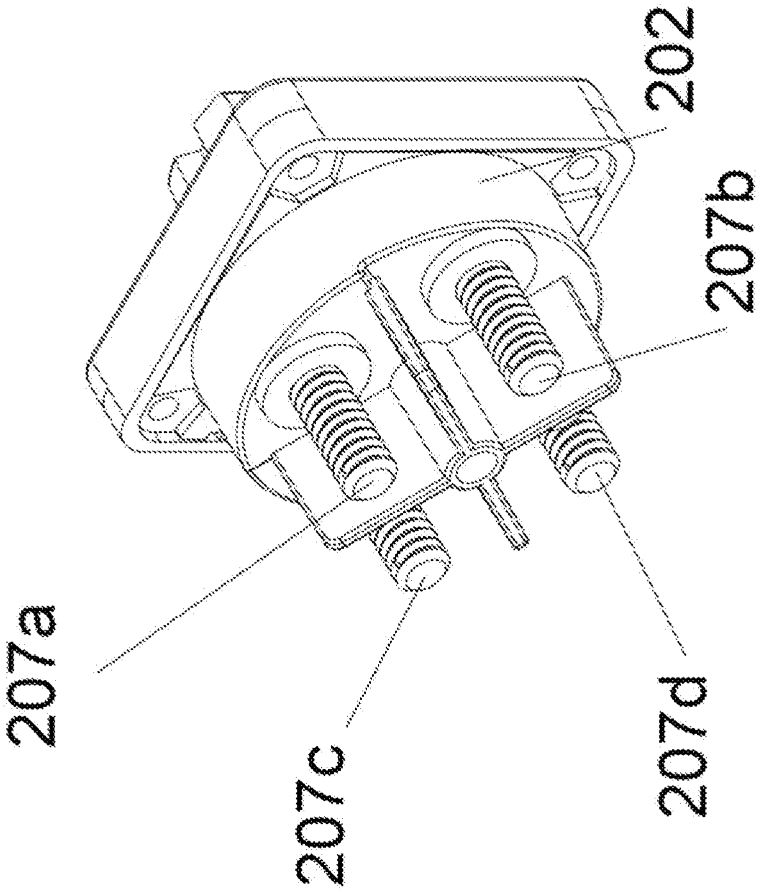
FIG. 12*c* is a perspective view of the embodiment of FIG. 12*a*, shown from below.

In other embodiments, a multi-pole switch may include an integrated overcurrent protection element. FIG. 12*a* is a view of an embodiment of a rotatable multi-pole switch, device 201, shown from above. FIG. 12*b* is a side view of the rotatable switch of FIG. 12*a*. FIG. 12*c* is a perspective view of the rotatable switch, shown from below.

The device 201 is similar in many ways to the device 101 of FIG. 8*a*, but differs in that, when in the "ON" position, the device 201 allows the batteries "1" and "2", referred to in the description of device 101, to separately power the "auxiliary" and "starter" circuits noted in device 101. When switched to the "combine" position, device 201 also allows the batteries "1" and "2" to be used in combination to power the "auxiliary" and "starter" circuit, similar to the "1+2" switch position of device 101. Like device 101, when device 201 is switched to the "ON" or "combine" positions, the "auxiliary" circuit is protected by the integrated overcurrent protection element 211.

The exterior of the device 201 is similar in some ways to the device 101 of FIG. 8*a*, in that the device 201 includes four terminals 207*a*, 207*b*, 207*c*, and 207*d* extending into the device 201 through the base 202. The device 201 includes a generally flat base 202 and a generally cup-shaped cover 203 having an internal compartment 204, an open end 205 and at least one through-hole 206 extending through the cover 203.

In the illustrated embodiment, the base 202 has four terminals 207*a*, 207*b*, 207*c*, and 207*d* extending therethrough, but other embodiments may include fewer or additional terminals. Each of the terminals 207*a*, 207*b*, 207*c*, and 207*d* is electrically connected to respective electrical contact points 208*a*, 208*b*, 208*c*, and 208*d*. Internal electrical contact point 208*e* is not connected to any terminal. As can be seen in FIG. 12*c*, the terminals 207*a*, 207*b*, 207*c*, and 207*d* are generally located along one or more diameters of base 202 at 90 degrees to each other. Electrical contact points 208*d* and 208*e* have stationary contact points 209*a* and 209*b* supported thereon.

In some embodiments, the device 201 is configured to be electrically connected to an engine starter circuit and to an auxiliary circuit which may include two batteries. The terminal 207*a* may be referred to as a starter terminal, the terminal 207*b* may be referred to as an auxiliary terminal, and the terminals 207*c* and 207*d* may be referred to respectively as battery terminals "1" and "2". Corresponding terminology may also be used for the corresponding electrical contact points and stationary contacts. The device 201 is not limited to use only in such an embodiment, but the use of this terminology is used herein to illustrate certain aspects of the operation of the device.

Similar to as shown in device 101, the base 202 of device 201 also includes a center post 210 aligned with a central axis of the device 201. The center post 210 supports an overcurrent protection element 211 which may be a bimetallic current sensing element configured to change shape in response to heat generated by current flow therethrough. The center post 210 may extend through the overcurrent protection element 211, which may be held in place on the center post 210 by a sleeve 213. The overcurrent protection element 211 includes two electrical contacts 212*a* and 212*b* supported thereon which mate with contact 209*a* and 209*b*.

Figure 14A:
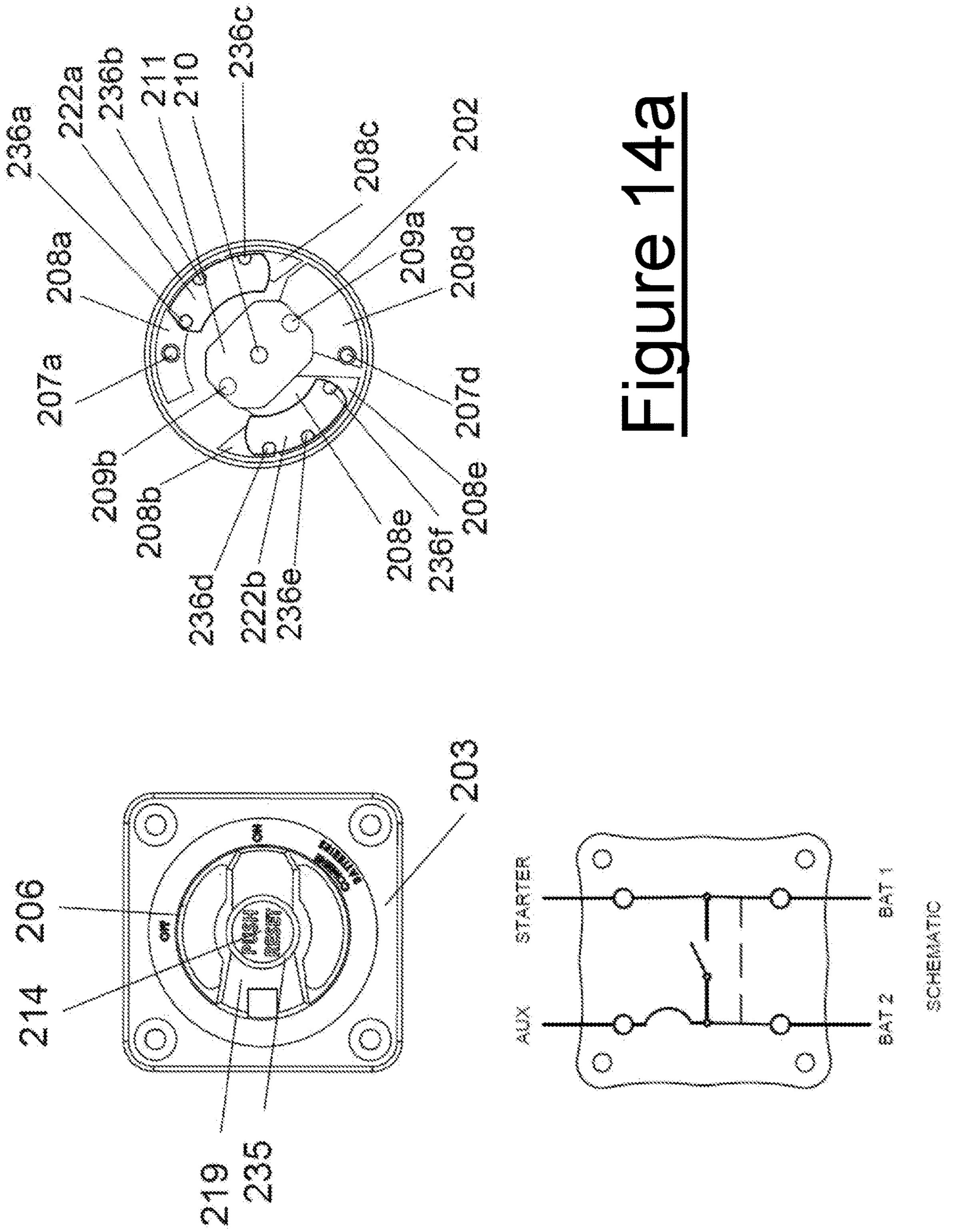
FIG. 14*a* is a top plan view of the rotatable multi-pole switch of FIG. 12*a*, with the switch in the "ON" position.

As can be seen in FIG. 14*a*, the device 201 also includes two mutually insulated curved bus bars 222*a* and 222*b* which in the illustrated embodiment extend in somewhat semicircular shapes. The curved bus bars 222*a* and 222*b* are formed from a conductive material and may be shaped to include a plurality of downwardly protruding sections 236 which are lower than at other portions of the bus bars 222*a* and 222*b*.

Figure 14C:
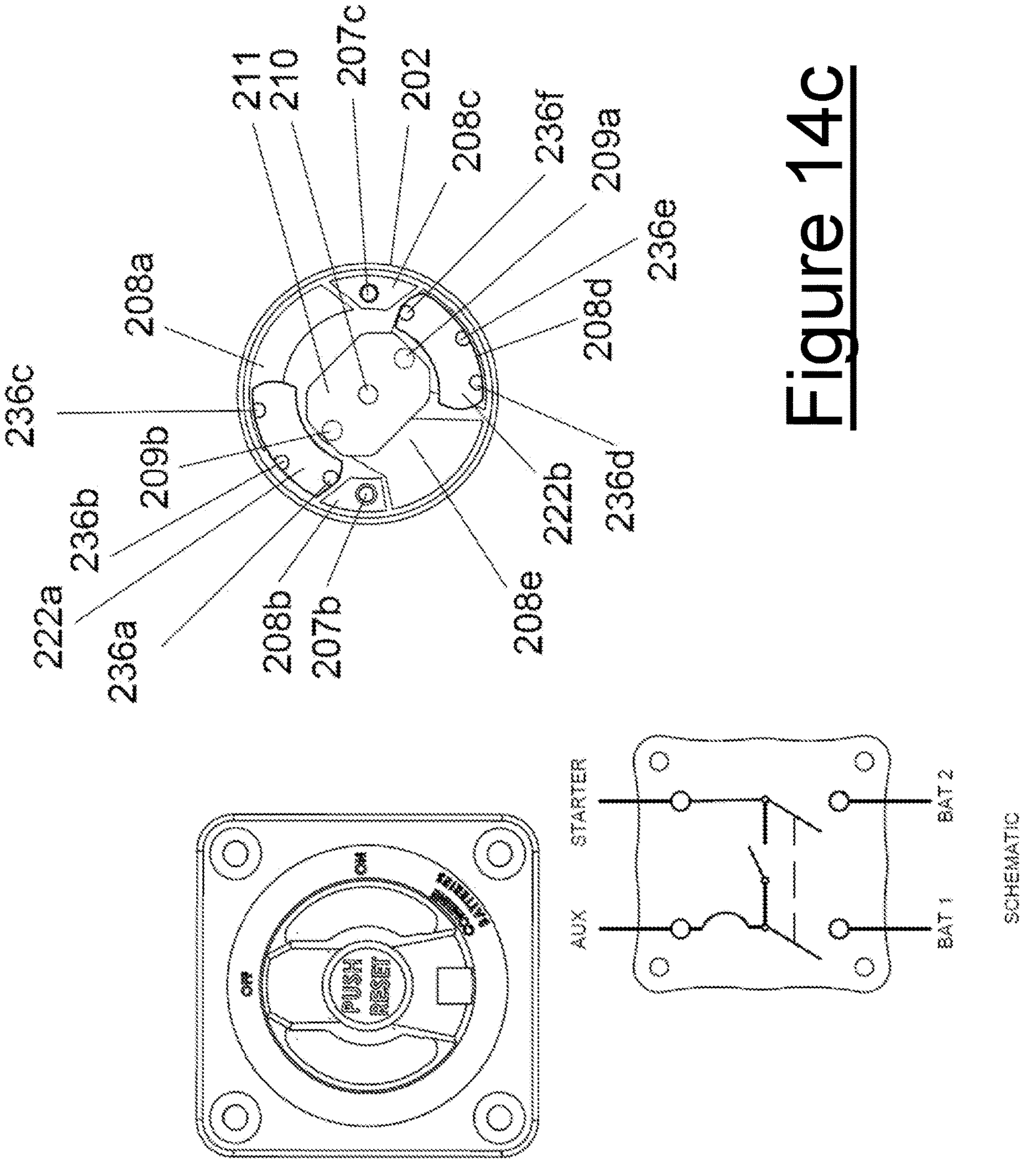
FIG. 14*c* is a top plan view of the rotatable multi-pole switch of FIG. 12*a*, with the switch in the "OFF" position.

The bus bars 222*a* and 222*b* are coupled to the insulating carrier ring 237 which is coupled to the switching actuator knob 219 to rotate along with the knob 219. In the illustrated embodiment, the bus bar 222*a* and 222*b* each include three downwardly protruding sections 236*a*, 236*b*, 236*c*, 236*d*, 236*e*, and 236*f*, the spacing of which is illustrated with respect to FIGS. 14*a* to 14*c*.

The switching actuator knob 219 concentric to both the reset button 214 and the cover through hole 206, protrudes through the cover through hole 206 to allow the knob 219 to be manually rotated. The rotation of the knob 219 is transmitted to the bus bars 222*a* and 222*b* through the insulating carrier ring 237 to the electrically conducting, basically semicircle shaped, moving bus bars 222*a* and 222*b*. The rotation of the knob 219 results in the rotation of the moving bus bars 222*a* and 222*b* around a rotational axis aligned with the center post 210.

A range of rotational positions of the moving bus bars 222*a* and 222*b* may be defined by a series of detents in the cover 203. Electrical contact pressure between each moving bus bar 222*a* and 222*b* and various contact points 208*a*-208*e* may be maintained by one or more contact springs 224, positioned between bottom of the switching actuator knob 219 and the insulating carrier ring 237, and thereby establishing one or more continuous electrical circuits between certain of the battery terminals 207*c* and 207*d* and the starter terminal 207*a* and the auxiliary terminal 207*b*. The knob 219 may also be manually rotated into the "OFF" position shown in FIG. 14*c*, rotating the bus bars 222*a* and 222*b* into contact with one or fewer of terminal contact points 208*a* and 208*d*, thereby opening all electrical circuits.

When device 201 is switched into the "ON" position, two separate circuits are established, one circuit connecting battery "1" with the starter, and the other circuit connecting battery "2" with auxiliary equipment. When the device 201 is switched into the "COMBINE" position, the two aforementioned circuits are connected together into a single circuit, allowing both battery "1" and battery "2" to power both circuits simultaneously. When the device 201 is switched into the "OFF" position, neither battery "1" nor battery "2" are connected to either circuit.

FIG. 14*a* is a top plan view of the rotatable multi-pole switch of FIG. 12*a*, with the switch in the "ON" position. FIG. 14*a* also shows an internal top view of the position of certain internal elements with the switch in the "ON" position and a simple electrical schematic diagram of the internal circuit. The bus bar 222*a* is rotated to a position in which the downwardly protruding sections 236*a* and 236*b* overlie and are in contact with electrical contact point 208*a*, and another of the downwardly protruding sections 236*c* overlies and is in contact with electrical contact point 208*c*. Contact between the bus bar 222*a* and the electrical contact points 208*a* and 208*c* may be maintained by one or more springs 224, which bias the insulating carrier ring 237 against the bus bar 222*a* which is then biased against the underlying electrical contact points. Current may then flow from battery "1" through battery terminal 207*c*, contact point 208*c*, downwardly protruding section 236*c*, bus bar 222*a*, downwardly protruding sections 236*a* and 236*b*, contact point 208*a*, and terminal 207*a* to the starter. Also with the switch in the "ON" position, bus bar 222*b* is rotated into a position in which the downwardly protruding section 236*d* overlies and is in contact with electrical contact point 208*b*, and the downwardly protruding sections 236*e* and 236*f* overlie and are in contact with electrical contact point 208*e*. Contact between the bus bar 222*b* and the electrical contact points 208*b* and 208*e* may be maintained by one or more springs 224, which bias the insulating carrier ring 237 against the bus bar 222*b* which is then biased against the bus bar 222*b* which is then biased against the underlying electrical contact points. Current may then flow from battery "2" through battery terminal 207*d*, contact point 208*d*, contact 209*a*, contact 212*a*, overcurrent protection element 211, contact 212*b*, contact 209*b*, contact point 208*e*, downwardly protruding sections 236*e* and 236*f*, bus bar 222*b*, downwardly protruding section 236*d*, contact point 208*b*, and terminal 207*b*. From there, current may flow to the auxiliary circuit.

FIG. 14*b* is a top plan view of the rotatable multi-pole switch of FIG. 12*a*, with the switch in the "COMBINE" position. FIG. 14*b* also shows an internal top view of the position of certain internal elements with the switch in the "COMBINE" position and a simple electrical schematic diagram of the internal circuit. The bus bar 222*a* is rotated to a position in which the downwardly protruding section 236*a* overlies and is in contact with electrical contact point 208*a*, downwardly protruding section 236*b* overlies and is in contact with electrical contact point 208*c* and downwardly protruding section 236*c* overlies and is in contact with electrical contact point 208*d*. Contact between the bus bar 222*a* and the electrical contact points 208*a*, 208*c*, and 208*d* may be maintained by one or more springs 224, which bias the insulating carrier ring 237 against bias the bus bar 222*a* which is then biased against the underlying electrical contact points. Current may then flow from battery "1" through battery terminal 207*c*, contact point 208*c*, downwardly protruding section 236*b*, bus bar 222*a*, downwardly protruding sections 236*a*, contact point 208*a*, and terminal 207*a* to the starter circuit. Current also may then flow from battery "2" through battery terminal 207*d*, contact point 208*d*, downwardly protruding section 236*c*, bus bar 222*a*, downwardly protruding section 236*a*, contact point 208*a*, and terminal 207*a* to the starter. Current also may then flow from battery "1" through battery terminal 207*c*, contact point 208*c*, downwardly protruding section 236*b*, bus bar 222*a*, downwardly protruding section 236*c*, contact point 208*d*, contact 209*a*, contact 212*a*, overcurrent protection element 211, contact 212*b*, contact 209*b*, contact point 208*e*, downwardly protruding section 236*f*, bus bar 222*b*, downwardly protruding section 236*e*, contact point 208*b*, and terminal 207*b*. From there, current may flow to the auxiliary circuit. Current also may then flow from battery "2" through battery terminal 207*d*, contact point 208*d*, contact 209*b*, contact 212*b*, overcurrent protection element 211, contact 212*b*, contact 209*b*, contact point 208*e*, downwardly protruding section 236*f*, bus bar 222*b*, downwardly protruding section 236*e*, contact point 208*b*, and terminal 207*b*. From there, current may flow to the auxiliary circuit.

When the switch is rotated into the "OFF" position, bus bar 222*a* will be in a position where it makes electrical contact only with the electrical contact points associated with the starter elements, and bus bar 222*b* will be in a position where it makes electrical contact only with the electrical contacts points associated with battery 2. In such a position, no current is allowed to flow through either bus bar 222*a* or 222*b*.

Figure 15:
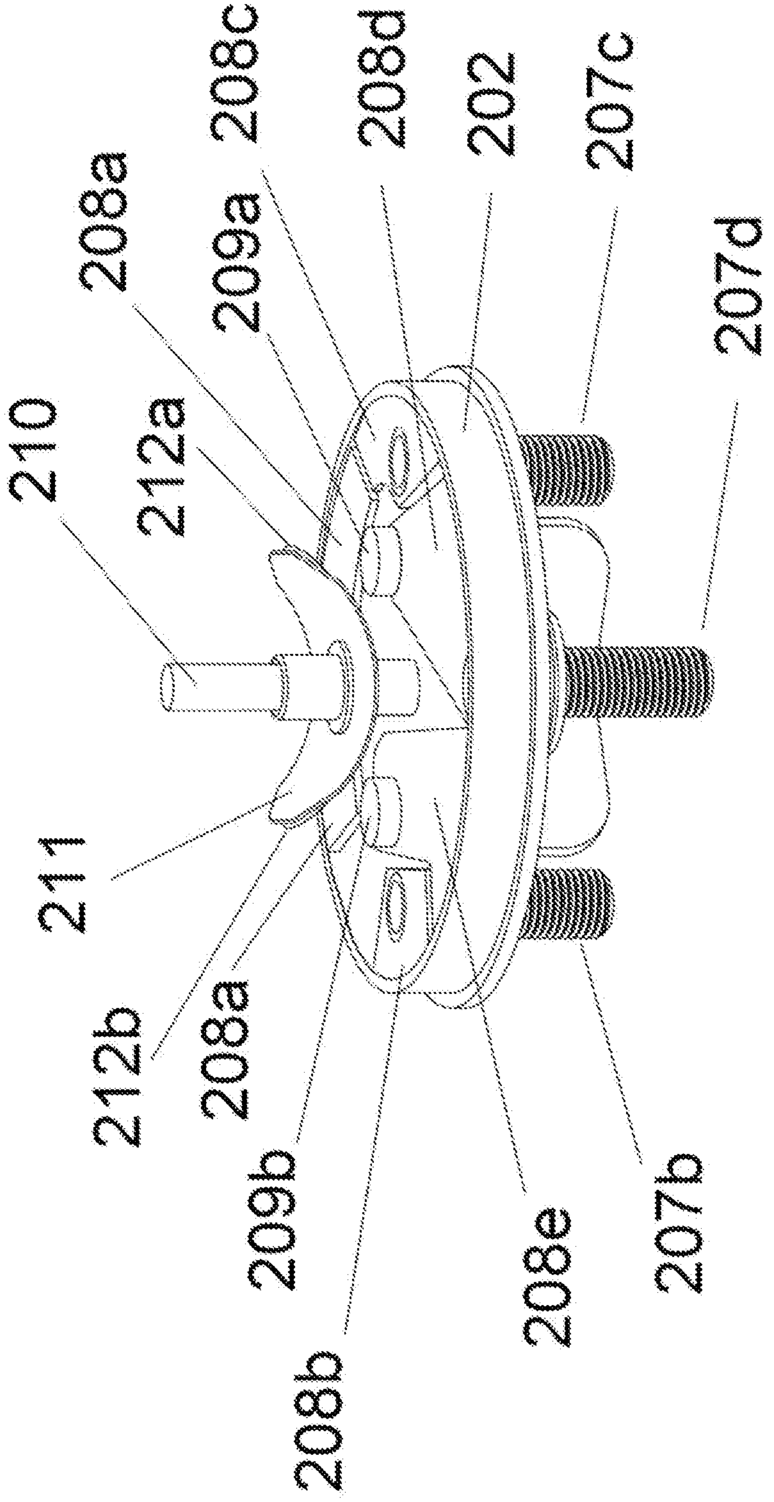
FIG. 15 is a perspective view of internal components of the rotatable multi-pole switch of FIG. 12*a*, with the overcurrent protection element in a tripped position.

FIG. 15 is a perspective view of internal components of the rotatable multi-pole switch of FIG. 12*a*, with the overcurrent protection element in a tripped position. When electrical current above a specified limit flows through the overcurrent protection element 211, the overcurrent protection element 211 responds to the Joule heating by rapidly changing shape from a first position in which the electrical contacts 212*a* and 212*b* are in contact with stationary contacts 209*a* and 209*b*, to a second position in which at least one of the pairs of contacts is separated, breaking the flow of current in the circuit between battery "2" terminal 207*d* and "auxiliary" terminal 207*b*, as shown in FIG. 15.

Figure 13:
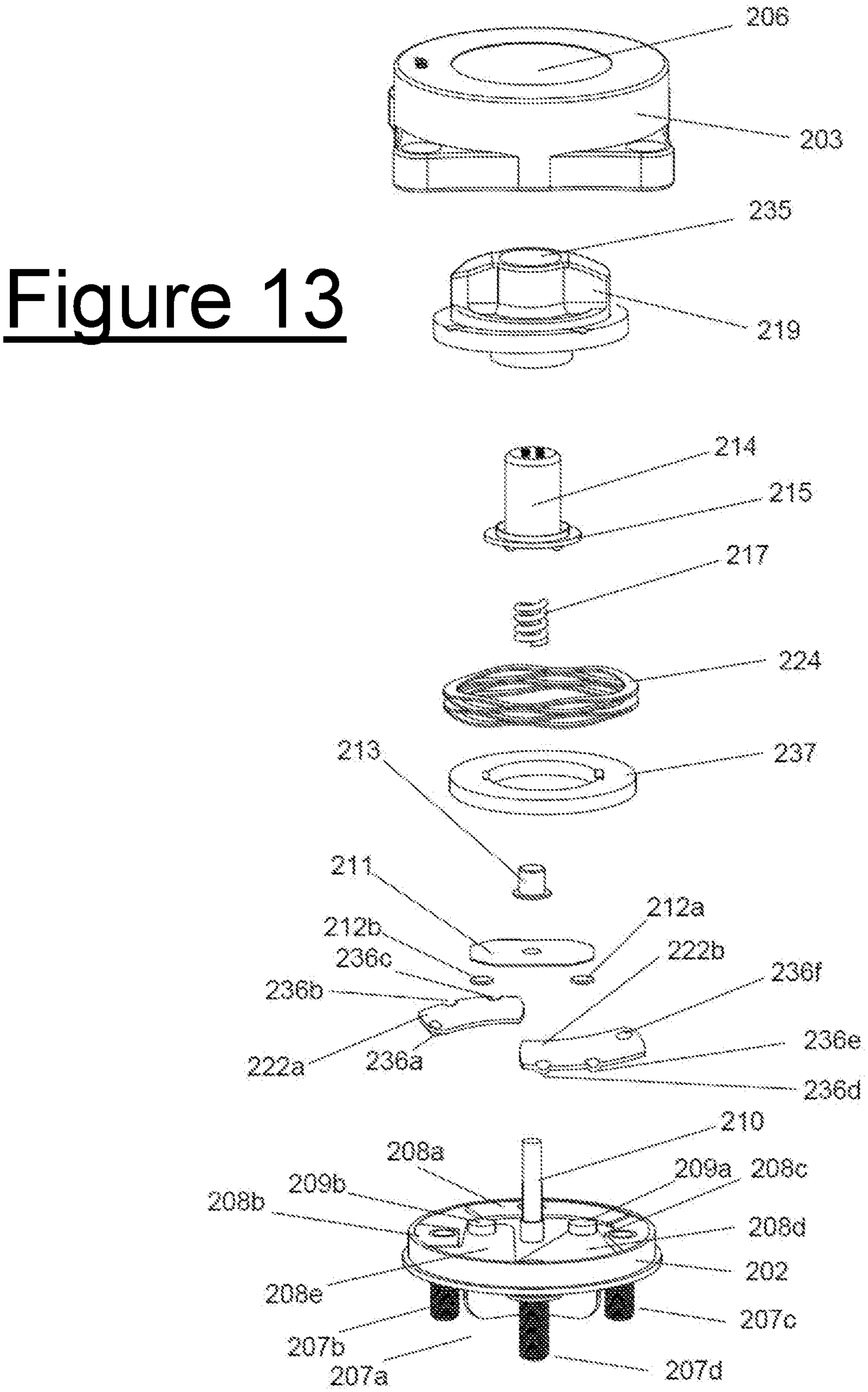
FIG. 13 is an exploded assembly view of the rotatable multi-pole switch of FIG. 12*a*.

When sufficiently cooled from the Joule heating, the overcurrent protection element 211 can be manually reset to its original position, bringing the electrical contacts 212*a* and 212*b* back into contact with stationary contacts 209*a* and 209*b* and reestablishing continuity in the circuit between battery "2" terminal 207*d* and "auxiliary" terminal 207*b*. This reset operation may be performed by manually depressing the reset button 214, which protrudes through the through hole 235 in the knob 219 (see FIG. 13), thereby also depressing the reset plate 215 concentrically positioned on the center post 210 onto the overcurrent protection element 211. This forces the overcurrent protection element 211 back into its original position. The return spring 217, axially aligned and with and concentric with the center post 210, serves to return the reset button 214 and reset plate 215 to their original position against the internal compartment of the cover 204 after this manual reset operation. One or more rivets (not shown) or a snap-type friction fit may be used to anchor the cover 203 to the base 202.

In another embodiment, the device 201 may not include the reset button 214 and reset plate 215, and there is no need to include the corresponding switching actuator knob through hole 235. In such an embodiment, the overcurrent protection element 211 may be designed such that, after cooling sufficiently from Joule heating, the element will automatically return from the open second position to its original first position, reclosing the electrical circuit.

In another embodiment of the device 201, one pair of contacts between the overcurrent protection element 211 and mating stationary contact (such as the pair of contacts 212*a* and 209*a* or the pair of contacts 212*b* and 209*b*), is replaced by a weld or rivet, attaching that end of the overcurrent protection element 211 to a terminal contact point and using only the other pair of contacts to break the circuit when the overcurrent protection element 211 flexes in response to an electrical current above a specified limit.

In another embodiment of the device 201, the overcurrent protection element 211 and associated electrical contacts 212*a* and 212*b* may be replaced by a fuse clip and cartridge fuse, transferring the function of the over-current protection feature of the illustrated embodiments from an overcurrent protection element 211 in the form of a bimetallic element, to the cartridge fusc.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A rotary switch including an integrated overcurrent protection device, the switch comprising:
- a housing
- a first terminal extending into the housing and electrically connected to a first terminal contact point;
- a second terminal extending into the housing and electrically connected to a second terminal contact point;
- an overcurrent protection element located within the housing and configured to be placed in electrical communication with the first terminal contact point at a first stationary contact location supported by the first terminal contact point and in electrical communication with the second terminal contact point at a second stationary contact location supported by the second terminal contact point;
- a third terminal extending into the housing and electrically connected to a third terminal contact point;
- a knob rotatable with respect to the housing; and
- an arcuate bus bar located within the housing and rotationally coupled to the knob to rotate in response to rotation of the knob, the arcuate bus bar movable between a first angular orientation in which the arcuate bus bar is electrically connected to the first terminal contact point and the third terminal contact point, and a second angular orientation in which the arcuate bus bar is not in electrical communication with either of the first terminal contact point or the third terminal contact point.

2. The rotary switch of claim 1, wherein the arcuate bus bar is movable in response to rotation of the knob between a first angular orientation in which the arcuate bus bar is electrically connected to the first terminal contact point and the third terminal contact point and a second orientation in which the arcuate bus bar is not in electrical communication with either of the first terminal contact point or the third terminal contact point.

3. The rotary switch of claim 1, wherein the arcuate bus bar is movable in response to rotation of the knob between a first angular orientation in which the arcuate bus bar is electrically connected to the first terminal contact point and the third terminal contact point and a second orientation in which the arcuate bus bar is not in electrical communication with at least one of the first terminal contact point or the third terminal contact point.

4. The rotary switch of claim 1, wherein the overcurrent protection element comprises a bimetallic element configured to change shape from a first position to a second position in response to electrical current above a specified limit.

5. The rotary switch of claim 4, further comprising a reset mechanism configured to reset the bimetallic element from the second position to the first position.

6. The rotary switch of claim 5, wherein the reset mechanism comprises a reset button concentric with a center post and a reset plate operably connected to the reset button, and wherein depressing the reset button forces the reset plate against the bimetallic element to move the bimetallic element to the first position.

7. The rotary switch of claim 5, wherein the reset button is concentric with the knob and extends through a throughhole in the knob.

8. A rotary switch including an integrated overcurrent protection device, the switch comprising:

a housing;

a first terminal extending into the housing and electrically connected to a first terminal contact point;

a second terminal extending into the housing and electrically connected to a second terminal contact point;

a third terminal extending into the housing and electrically connected to a third terminal contact point;

an overcurrent protection element located within the housing;

a knob rotatable with respect to the housing; and a rotatable conductive element located within the housing and rotationally coupled to the knob to rotate in response to rotation of the knob, the conductive element rotatable between a first angular orientation in which the conductive element is electrically connected to the first and second terminal contact points and a second angular orientation in which the rotatable conductive element is not electrically connected to at least one of the first and second terminal contact points.

9. The rotary switch of claim 8, wherein the overcurrent protection element comprises a bimetallic element configured to change shape from a first position to a second position in response to electrical current above a specified limit.

10. The rotary switch of claim 9, further comprising a reset mechanism configured to reset the bimetallic element from the second position to the first position, wherein the reset mechanism comprises a reset button concentric with a center post and a reset plate operably connected to the reset button, and wherein depressing the reset button forces the reset plate against the bimetallic element to move the bimetallic element to the first position.

11. The rotary switch of claim 9, wherein the reset button is concentric with the knob and extends through a through-hole in the knob.

12. The rotary switch of claim 8, wherein the overcurrent protection element is configured to be placed in electrical communication with the first terminal contact point at a first stationary contact location supported by the first terminal contact point and in electrical communication with the third terminal contact point at a second stationary contact location supported by the third terminal contact point.

13. The rotary switch of claim 8, wherein the rotatable conductive element comprises an arcuate bus bar.

14. The rotary switch of claim 13, wherein the arcuate bus bar is movable in response to rotation of the knob between the first angular orientation in which the arcuate bus bar is electrically connected to the first terminal contact point and the second terminal contact point and the second orientation in which the arcuate bus bar is not in electrical communication with either or both of the first terminal contact point or the second terminal contact point.

15. The rotary switch of claim 13, wherein the arcuate bus bar includes at least a first longitudinally protruding section and a second longitudinally protruding section, the first and second longitudinally protruding sections located closer to the first, second, and third terminal contact points than a recessed portion of the arcuate bus bar extending between the first and second longitudinally protruding sections, and wherein, when the arcuate bus bar is at the first angular orientation, the first longitudinally protruding section is in contact with the first terminal contact point and the second longitudinally protruding section is in contact with the second terminal contact point.

16. The rotary switch of claim 8, further comprising a fourth terminal extending into the housing and electrically connected to a fourth terminal contact point.

17. The rotary switch of claim 8, wherein the overcurrent protection element is configured to be placed in electrical communication with the first terminal contact point at a first stationary contact location supported by the first terminal contact point and in electrical communication with the third terminal contact point at a second stationary contact location supported by the third terminal contact point, and wherein the rotatable conductive element comprises an arcuate bus bar.

18. The rotary switch of claim 17, wherein the arcuate bus bar is movable between:

a first angular orientation in which the arcuate bus bar is electrically connected to the first terminal contact point and the second terminal contact point, a second angular orientation in which the arcuate bus bar is not in electrical communication with any of the first terminal contact point, the second terminal contact point, or the fourth terminal contact point;

a third angular orientation in which the arcuate bus bar is electrically connected to the first terminal contact point, the second terminal contact point, and the fourth terminal contact point; and a fourth angular orientation in which the arcuate bus bar is electrically connected to the first terminal contact point and the fourth terminal contact point.

19. The rotary switch of claim 18, further comprising an insulating retainer supporting the arcuate bus bar or supporting a first arcuate bus bar and a second arcuate bus bar, wherein the insulating retainer comprises a retainer ring, and wherein the insulating retainer is biased in the direction of the terminal contact points by at least one spring.

20. The rotary switch of claim 17, wherein the overcurrent protection element is configured to be placed in electrical communication with an internal contact point at a first stationary contact location supported by the internal contact point and in electrical communication with the second terminal contact at a second stationary contact location supported by the second terminal contact, the internal contact point not otherwise connected to any of the terminals, and wherein the rotatable conductive element comprises a first arcuate bus bar, the switch further comprising a second arcuate bus bar rotationally coupled to the first arcuate bus bar to rotate along with the first arcuate bus bar in response to rotation of the knob, and wherein the first and second arcuate bus bars are movable between:

a first angular orientation in which the first arcuate bus bar is electrically connected to the first terminal contact point and the third terminal contact point and the second arcuate bus bar is electrically connected to the fourth terminal contact point and the internal contact point, a second angular orientation in which the first arcuate bus bar is electrically connected to the first terminal contact point, the second terminal contact point, and the third terminal contact point, and the second arcuate bus bar is electrically connected to the fourth terminal contact point and the internal contact point, and a third angular orientation in which the first arcuate bus bar is in electrical communication with the first terminal contact point, and is not in electrical communication with any of the second terminal contact point, the third terminal contact point, the fourth terminal contact point, or the internal contact point, and in which the second arcuate bus bar is only in electrical communication with the second terminal contact point, and is not in electrical communication with any of the first terminal contact point, the third terminal contact point, the fourth terminal contact point, or the internal contact point.

* * * * *